(12) United States Patent
Yoon

(10) Patent No.: US 12,511,984 B2
(45) Date of Patent: Dec. 30, 2025

(54) COOKING APPARATUS FOR DETECTING FIRE HAZARD, AND METHOD OF CONTROLLING THE COOKING APPARATUS

(71) Applicant: SAMSUNG ELECTRONICS CO., LTD., Suwon-si (KR)

(72) Inventor: Seokjung Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 187 days.

(21) Appl. No.: 18/237,738

(22) Filed: Aug. 24, 2023

(65) Prior Publication Data

US 2024/0071195 A1    Feb. 29, 2024

Related U.S. Application Data

(63) Continuation of application No. PCT/KR2023/012101, filed on Aug. 16, 2023.

(30) Foreign Application Priority Data

Aug. 24, 2022    (KR) .................... 10-2022-0106341
Sep. 26, 2022    (KR) .................... 10-2022-0121970

(51) Int. Cl.
*G08B 17/12*    (2006.01)
*F24C 7/08*    (2006.01)
(Continued)

(52) U.S. Cl.
CPC ............ *G08B 17/125* (2013.01); *F24C 7/082* (2013.01); *F24C 15/002* (2013.01);
(Continued)

(58) Field of Classification Search
CPC ...... G08B 17/125; G06V 10/56; G06V 20/52; F24C 7/082; F24C 15/002; F24C 15/003
(Continued)

(56) References Cited

U.S. PATENT DOCUMENTS 9,662,519 B2   5/2017   Livchak et al.
11,622,651 B2   4/2023   Jung et al.
(Continued)

FOREIGN PATENT DOCUMENTS

JP    5013971 B2   8/2012
JP    5460762 B2   4/2014
(Continued)

OTHER PUBLICATIONS

International Search Report (PCT/ISA/210) and Written Opinion (PCT/ISA/237) issued by the International Searching Authority on Nov. 20, 2023 in corresponding International Application No. PCT/KR2023/012101.

*Primary Examiner* — Kam Wan Ma
(74) *Attorney, Agent, or Firm* — Sughrue Mion, PLLC

(57) ABSTRACT

A cooking apparatus comprises: a cooking chamber configured to accommodate objects to be cooked; a camera configured to photograph the inside of the cooking chamber; an output interface; a memory configured to store at least one instruction; and at least one processor, wherein the at least one processor is configured to execute the at least one instruction to: detect a fire hazard during cooking based on a captured image obtained by the camera; and based on the detection of the fire hazard, outputting a fire hazard notification through the output interface.

20 Claims, 31 Drawing Sheets

(51) Int. Cl.
*F24C 15/00* (2006.01)
*G06V 10/56* (2022.01)
*G06V 20/52* (2022.01)

(52) U.S. Cl.
CPC ............ *F24C 15/003* (2013.01); *G06V 10/56* (2022.01); *G06V 20/52* (2022.01)

(58) Field of Classification Search
USPC ........................................................ 340/578
See application file for complete search history.

(56) References Cited

U.S. PATENT DOCUMENTS

| | | |
|---|---|---|
| 2013/0242091 A1 | 9/2013 | Park |
| 2017/0277954 A1* | 9/2017 | Chang .............. G06V 30/19173 |
| 2019/0162420 A1 | 5/2019 | Wu |
| 2021/0074139 A1* | 3/2021 | Sulucz ................... G06T 7/136 |
| 2021/0182667 A1 | 6/2021 | Maeng |
| 2021/0259256 A1 | 8/2021 | Stork genannt Wersborg |
| 2024/0044511 A1 | 2/2024 | Heckmann et al. |
| 2024/0125483 A1* | 4/2024 | Ashley ................... A62C 37/38 |

FOREIGN PATENT DOCUMENTS

| | | |
|---|---|---|
| JP | 2019-101948 A | 6/2019 |
| JP | 2021-103038 A | 7/2021 |
| KR | 0145095 B1 | 8/1998 |
| KR | 10-2002-0036396 A | 5/2002 |
| KR | 10-2009-0014799 A | 2/2009 |
| KR | 10-1339405 B1 | 12/2013 |
| KR | 10-1898503 B1 | 9/2018 |
| KR | 10-1916505 B1 | 11/2018 |
| KR | 10-1993851 B1 | 6/2019 |
| KR | 10-2032549 B1 | 11/2019 |
| KR | 10-2099726 B1 | 4/2020 |
| KR | 10-2172572 B1 | 11/2020 |
| KR | 10-2021-0074648 A | 6/2021 |
| KR | 10-2298627 B1 | 9/2021 |
| KR | 10-2400018 B1 | 5/2022 |

* cited by examiner

FIG. 7B
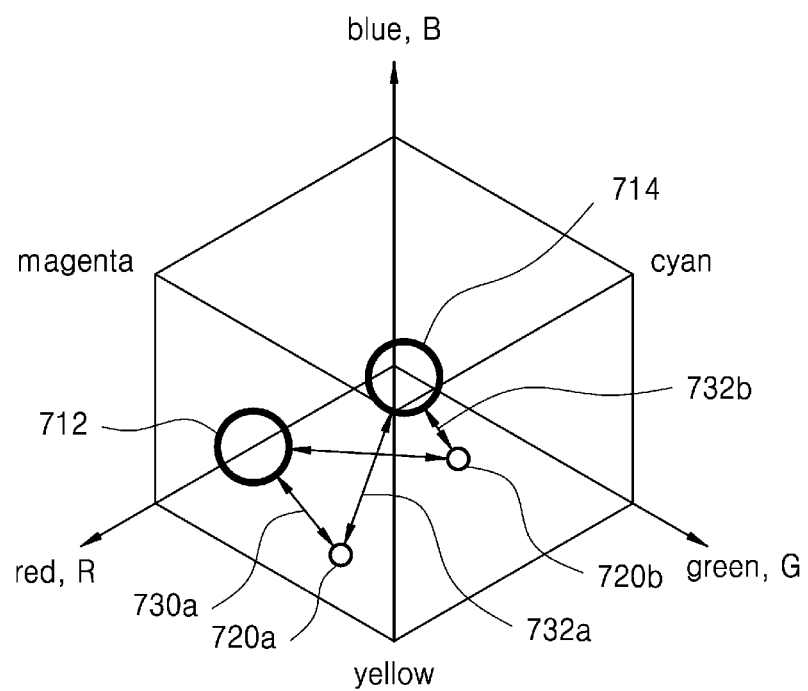
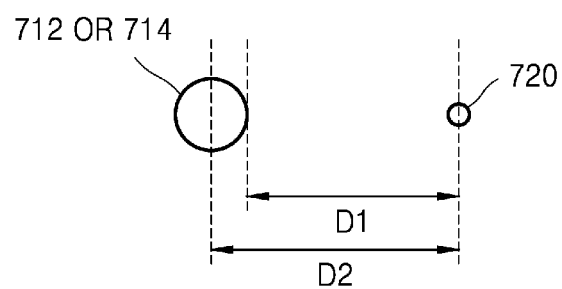

FIG. 23
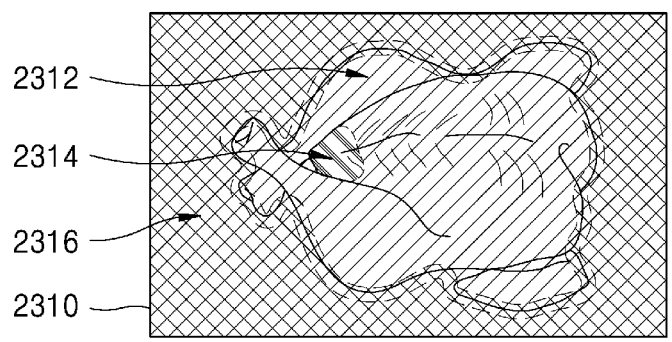
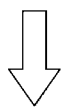
| COLOR | SIMILARITY TO FLAME -RELATED COLOR | SIMILARITY TO SMOKE -RELATED COLOR | RESULT OF MONITORING REGION SELECTION |
|---|---|---|---|
| | LOW | HIGH | FLAME MONITORING REGION |
| | HIGH | LOW | SMOKE MONITORING REGION |
| | LOW | LOW | FLAME MONITORING REGION SMOKE MONITORING REGION |

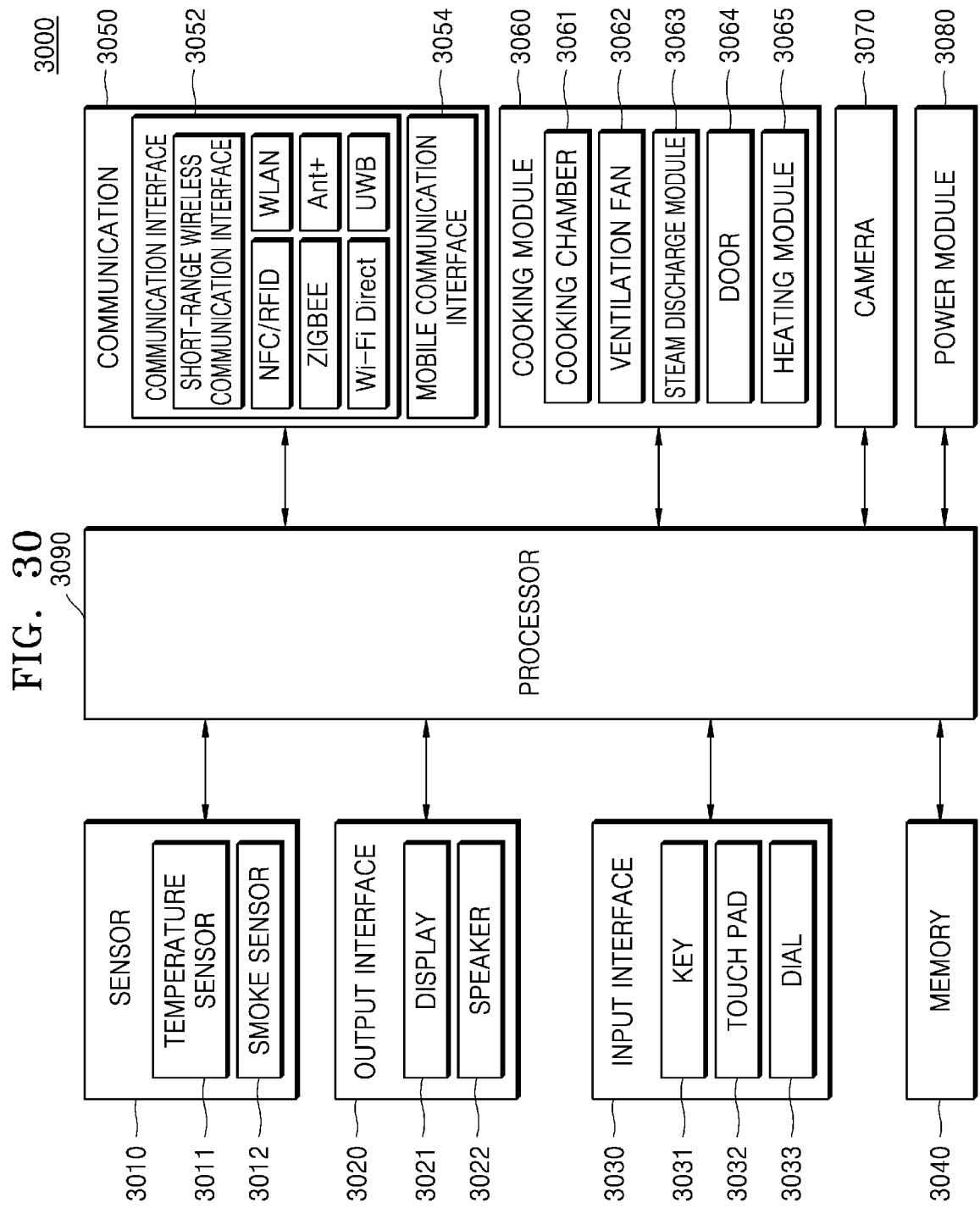

COOKING APPARATUS FOR DETECTING FIRE HAZARD, AND METHOD OF CONTROLLING THE COOKING APPARATUS

CROSS-REFERENCE TO RELATED APPLICATIONS

This application is a continuation of International Application No. PCT/KR2023/012101, filed on Aug. 16, 2023, which claims priority to Korean Patent Application No. 10-2022-0106341, filed on Aug. 24, 2022, and Korean Patent Application No. 10-2022-0121970, filed on Sep. 26, 2022, in the Korean Intellectual Property Office, the disclosures of which are incorporated by reference herein their entireties.

BACKGROUND

1. Field

Embodiments of the disclosure relate to a cooking apparatus for detecting a fire hazard, a method of controlling the cooking apparatus, and a computer-readable recording medium having recorded thereon a computer program, which, when executed by a computer, performs the method of controlling the cooking apparatus.

2. Description of Related Art

Among all household appliances, cooking apparatuses cause the highest risk of fire. During cooking using a cooking apparatus, when oil with a low smoke point is selected as an ingredient, a fire may occur in the cooking apparatus. Furthermore, when an object that should not be put inside a cooking apparatus (e.g., a microwave oven), is accidentally inserted, a fire may occur.

In the case of a cooking apparatus such as an oven, when an oven door is opened, a fire alarm is often unnecessarily triggered in a house due to smoke produced during cooking. Furthermore, smoke produced during a cooking process covers food being cooked, making it difficult to check the inside of the oven and making it difficult to check a status of the cooking process.

SUMMARY

According to an embodiment of the disclosure, a cooking apparatus comprises: a cooking chamber accommodating objects to be cooked; a camera configured to photograph an inside of the cooking chamber; an output interface; a memory configured to store at least one instruction; and at least one processor, wherein the at least one processor is configured to execute the at least one instruction to: detect a fire hazard during cooking based on a captured image obtained by the camera; and based on the detection of the fire hazard, outputting a fire hazard notification through the output interface.

According to an embodiment of the disclosure, a method of controlling a cooking apparatus, in which the cooking apparatus includes a camera that photographs an inside of a cooking chamber accommodating an object to be cooked, comprises: photographing the inside of the cooking chamber by using the camera; detecting a fire hazard during cooking, based on a captured image obtained by photographing the inside of the cooking chamber; and based on detection of the fire hazard, outputting a fire hazard notification.

According to an embodiment of the disclosure, a computer-readable recording medium has recorded thereon a computer program, which, when executed by a computer, performs the method of controlling the cooking apparatus.

BRIEF DESCRIPTION OF DRAWINGS

FIG. 7B is a view illustrating a process of comparing a monitoring region with a fire-related color in a color space, according to an embodiment of the disclosure.

FIG. 23 illustrates a process of setting a monitoring region, based on color data of a captured image, according to an embodiment of the disclosure.

FIG. 30 is a block diagram of a structure of a cooking apparatus according to an embodiment of the disclosure.

DETAILED DESCRIPTION

Figure 1:
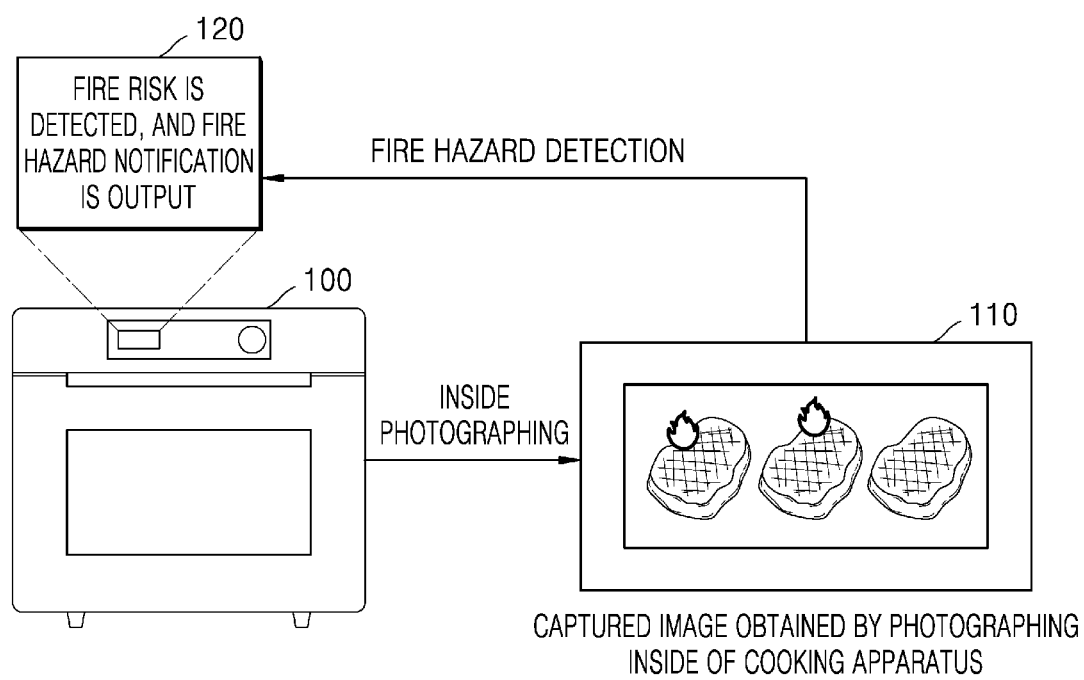
FIG. 1 is a view of an operation of a cooking apparatus according to an embodiment of the disclosure.

Various embodiments and terms used herein are not intended to limit the technical features mentioned herein to particular embodiments, and it is to be appreciated that all changes, equivalents, and/or substitutes that do not depart from the spirit and technical scope are encompassed in the disclosure.

Regarding the description of the drawings, like reference numerals denote similar or related elements.

The singular form of a noun corresponding to an item may include one item or a plurality of items, unless a relevant context clearly dictates otherwise.

Each of expressions "A or B", "at least one of A and B", "at least one of A or B", and "one or more of A and/or B", "A, B, or C," "at least one of A, B, and C", and "at least one of A, B, or C" may include any one of listed items and all of at least one combination of the items.

The term "and/or" used herein includes any and all combinations of one or more of the associated listed items.

Terms such as "first", "second", "primarily", or "secondary" used herein may represent various elements regardless of order and/or importance, and do not limit corresponding elements. These terms may be used for distinguishing one element from another element.

When an element (e.g., a first element) is mentioned as being "coupled to" or "connected to" another element (e.g., a second element) together with or without the term "operatively" or "communicatively", this may mean that the element may be directly (e.g., by wire) or wirelessly coupled to the other element or another (e.g., a third element) may exist therebetween.

Terms such as "including," "having," and "comprising" used herein are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

When a component is said to be "connected to", "coupled to", "supported by" or "contact" another component, this may include not only a case where the components are directly connected to, coupled to, supported by, or contact each other, but also a case where the components are indirectly connected to, coupled to, supported by, or contact with each other through a third component.

When a component is said to be located "on" another component, this includes not only a case in which a component is in contact with another component, but also a case in which another component exists between two components.

The operational principles of embodiments of the disclosure and various embodiments of the disclosure will now be described more fully with reference to the accompanying drawings.

FIG. 1 is a view of an operation of a cooking apparatus according to an embodiment of the disclosure.

According to an embodiment of the disclosure, a camera may be disposed inside or adjacent to the cooking apparatus 100, which may be used to photograph the interior of a cooking apparatus 100. In one or more examples, a fire hazard may be detected based on a captured image 110 obtained by photographing the interior. In one or more examples, cooking apparatus 100 may include the camera that photographs the interior. The camera may detect the risk of fire of the cooking apparatus 100 from the captured image 110 obtained by photographing the interior of the cooking apparatus. When a fire risk is detected, the cooking apparatus 100 may output a fire hazard notification 120. The cooking apparatus 100 may output the fire hazard notification 120 through an output interface of the cooking apparatus 100 or may output the fire hazard notification 120 through an external device. The fire hazard notification may be an audible notification or a visual notification (e.g., text or symbol outputted to a display).

The cooking apparatus 100 may include special sensors such as a $CO_2$ sensor, a temperature sensor, a smoke sensor, or any other suitable sensor known to one of ordinary skill in the art, to detect a risk of fire. The cooking apparatus 100, according to embodiments of the disclosure, may detect a fire hazard by using the camera inside the cooking apparatus 100, without including one of the aforementioned sensors for determining fire. The cooking apparatus 100 may perform additional operations such as monitoring of a cooking process and recommendation of a recipe, as well as first hazard detection, by using the internal camera. According to an embodiment of the disclosure, the cooking apparatus 100 having a camera may detect a fire hazard without a special sensor and inform a user of the fire hazard.

Figure 2:
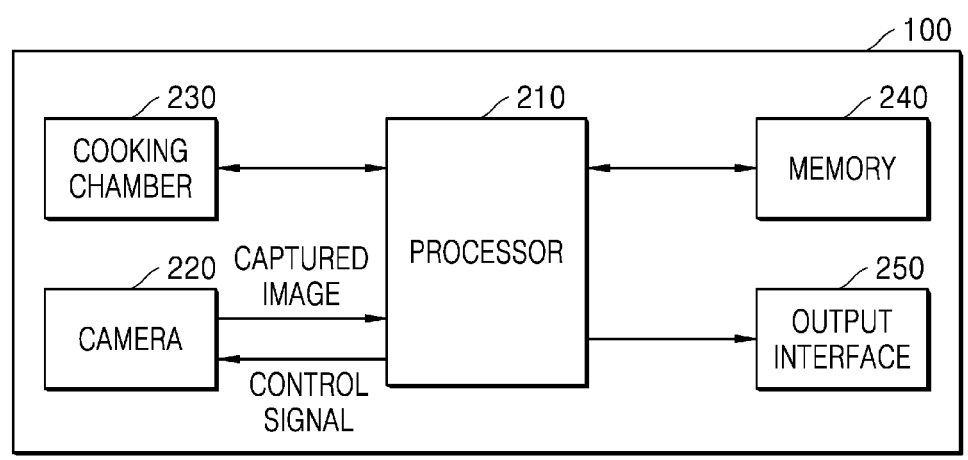
FIG. 2 is a block diagram of a structure of a cooking apparatus according to an embodiment of the disclosure.

FIG. 2 is a block diagram of a structure of a cooking apparatus according to an embodiment of the disclosure.

The cooking apparatus 100 according to an embodiment of the disclosure includes various types of cooking apparatuses 100 that cook in a high-temperature environment or cook by causing heat from ingredients. The cooking apparatus 100 may be implemented in the form of, for example, an oven, a microwave oven, an air fryer, a smart cooker, a toaster, or any other suitable cooking device known to one of ordinary skill in the art.

According to an embodiment of the disclosure, the cooking apparatus 100 may include a processor 210, a camera 220, a cooking chamber 230, a memory 240, and an output interface 250.

According to an embodiment, the processor 210 may control all operations of the cooking apparatus 100. The processor 210 may be implemented as one or more processors. The processor 210 may perform a certain operation by executing an instruction or command stored in the memory 240. The processor 210 may control operations of components included in the cooking apparatus 100. The processor 210 may include at least one of a central processing unit (CPU), a graphics processing unit (GPU), or a neural processing unit (NPU), or a combination thereof.

The camera 220 photoelectrically converts incident light to generate an electrical image signal. The camera 220 may include at least one lens, a lens driving unit, and an image sensor. The camera 220 may be disposed to photograph the inside of the cooking chamber 230. For example, the camera 220 may be disposed on the ceiling of a cooking chamber, on a door 310 of the cooking chamber, or on a lateral side of the cooking chamber. The processor 220 may include one or more cameras 220. The camera 220 creates captured image data and outputs the captured image data to the processor 210.

The processor 210 may control a photographing operation of the camera 220 according to an operation mode. According to an embodiment of the disclosure, the processor 210 may control the camera 220 to photograph the inside of the cooking chamber while the cooking apparatus 100 is performing a cooking operation. The processor 210 may start a cooking operation, based on a user input of requesting a start of cooking, and may start a photographing operation of the camera 220 according to the request to start cooking. The execution of the photographing may be performed automatically based on a determination of one or more predetermined conditions being satisfied (e.g., internal heat reaches a predetermined temperature, a predetermined amount of time has elapsed since the start of the cooking). In one or more examples, the photographing may be executed based on an input from a user.

A captured image may include a still image or a moving picture. According to an embodiment of the disclosure, the captured image may correspond to a real-time moving picture obtained by photographing the inside of the cooking chamber while a cooking operation is being performed. According to an embodiment of the disclosure, the captured image may correspond to a real-time moving picture obtained by photographing the inside of the cooking chamber at regular time intervals, while a cooking operation is being performed. According to an embodiment of the disclosure, the captured image may correspond to a still image or moving picture obtained by photographing the inside of the cooking chamber, based on a user input.

The captured image captured by the camera 220 may be an image compressed in a format such as H.264 or JPEG. When the captured image is a compressed image, the processor 210 creates a captured image in a format, such as YUV or RGB, through a decoding process. The processor 210 obtains color data of a captured image from a decoded captured image.

The cooking chamber 230 corresponds to a cooking space that accommodates ingredients. The cooking chamber 230 includes a space formed by partition walls blocked from the outside. The cooking chamber 230 may include a tray or shelf on which ingredients may be placed. The cooking chamber 230 may be insulated by an insulating member to block internal heat. According to an embodiment of the disclosure, the cooking apparatus 100 may output heat from a heating device to the cooking chamber 230 to perform a cooking operation inside the cooking chamber 230. According to an embodiment of the disclosure, the cooking apparatus 100 may output microwaves from a microwave output device to the cooking chamber 230 to perform a cooking operation inside the cooking chamber 230.

According to an embodiment of the disclosure, the cooking chamber 230 may be opened or blocked from the outside by an openable door. According to an embodiment of the disclosure, the cooking chamber 230 may correspond to a drawer-type basket, and may be opened or blocked from the outside by an insertion or withdrawal operation of the drawer-type basket.

The processor 210 may detect a fire hazard inside the cooking chamber, based on the captured image. The processor 210 may detect the fire hazard, based on color data of the captured image. The processor 210 may detect the fire hazard by comparing a predefined fire-related color with the color data of the captured image. The predefined fire-related color may be a color corresponding to smoke or flame. In one or more examples, the predefined fire-related color may be defined as a predetermined color coordinate region in a color space. The predefined fire-related color may include a smoke color region related to smoke and a flame color region related to flame.

The processor 210 may identify at least one monitoring region based on color data of each pixel of the captured image. The at least one monitoring region may be a predetermined region in the captured image, and may include one or more pixels. The processor 210 may identify a region having a color having a low similarity to the fire-related color as the monitoring region. The processor 210 monitors a color change of the monitoring region. The processor 210 may determine that a fire hazard has occurred when a similarity between the color data of the monitoring region and the fire-related color is equal to or greater than a reference value.

According to an embodiment of the disclosure, the processor 210 previously may obtain ingredient information about the ingredients disposed inside the cooking chamber, and may select the monitoring region of the captured image based on the obtained ingredient information. The processor 210 may select a region having a low similarity to the fire-related color as the monitoring region, based on the ingredient information. The processor 210 may change a weight of the monitoring region or a reference value related to a similarity with the fire-related color according to the ingredient information.

According to an embodiment of the disclosure, the processor 210 may select the monitoring region, based on the color data of the captured image, without obtaining information on ingredients in advance. The processor 210 may select the region having a low similarity to the fire-related color as the monitoring region, based on the color data of the captured image.

The memory 240 stores various pieces of information, data, instructions, programs, etc. necessary for operations of the cooking apparatus 100. The memory 240 may include one or both of volatile memory and nonvolatile memory, or a combination thereof. The memory 240 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk. The memory 240 may correspond to a web storage or a cloud server which performs a storage function on the Internet.

The output interface 250 may output information and data related to the operations of the cooking apparatus 100. The output interface 250 may include, for example, a display, a speaker, and a light emitting diode (LED).

The output interface 250 outputs a fire hazard notification when a fire hazard is detected. The fire hazard notification may include at least one of visual information or audio information. According to an embodiment of the disclosure, the fire hazard notification may include a message that is displayed via the display. According to an embodiment of the disclosure, the fire hazard notification may include a voice message that is output via the speaker.

According to an embodiment of the disclosure, the fire hazard notification may include at least one of information indicating that a fire hazard has been detected, the type of fire hazard, response guide information, or cooking apparatus operation change information. The type of fire hazard may include information such as smoke detection, flame detection, or temperature spike. The response guide information may include, for example, a request to open a door, a request to cut off power, or a request to prohibit contact. The cooking apparatus operation change information may include information such as door unlocking, cooking operation interruption, automatic power cutoff, or steam discharge from the cooking chamber.

Figure 3:
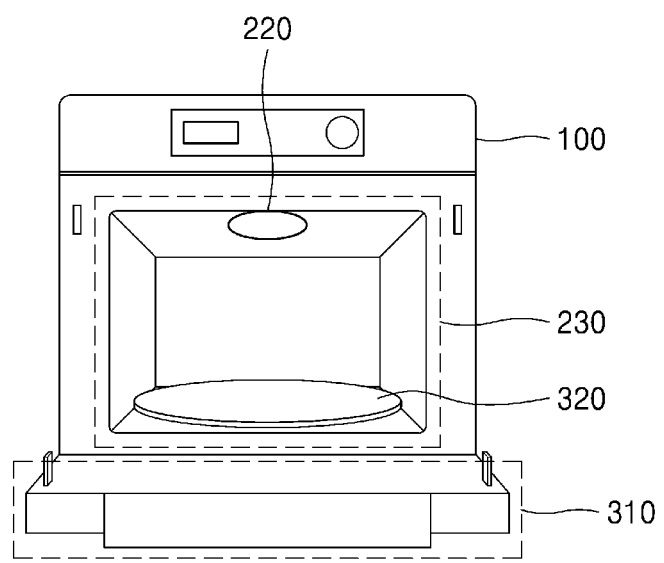
FIG. 3 illustrates a structure of a cooking apparatus according to an embodiment of the disclosure.

FIG. 3 illustrates a structure of the cooking apparatus 100 according to an embodiment of the disclosure.

According to an embodiment of the disclosure, the cooking apparatus 100 may be opened or blocked from the outside by opening or closing the door 310. The cooking chamber 230 may accommodate food ingredients in an internal space. The cooking chamber 230 may include a tray 320 on which food ingredients may be placed.

The camera 220 may be disposed on the ceiling of the cooking chamber 230 to photograph a cooking process of ingredients disposed inside the cooking chamber 230.

Figure 4:
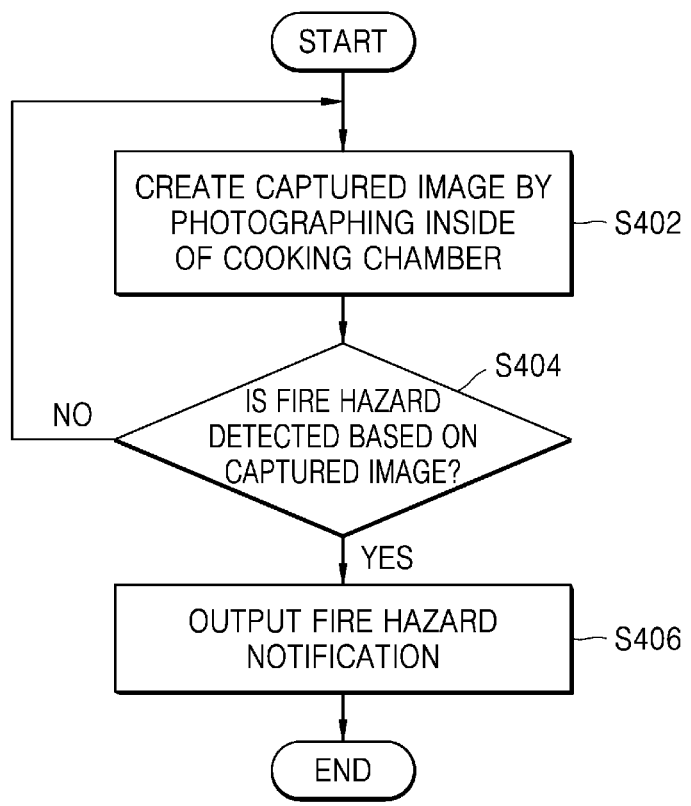
FIG. 4 is a flowchart of a method of controlling a cooking apparatus, according to an embodiment of the disclosure.

FIG. 4 is a flowchart of a method of controlling a cooking apparatus, according to an embodiment of the disclosure.

The method of controlling a cooking apparatus, according to an embodiment of the disclosure, may be performed by various types of cooking apparatuses. In the disclosure, an embodiment in which a cooking apparatus controlling method is performed by the cooking apparatus 100 according to an embodiment of the disclosure will be mainly described. However, the cooking apparatus controlling method according to an embodiment of the disclosure is not limited to being performed by the cooking apparatus 100 of the disclosure.

In operation S402, the cooking apparatus 100 creates a captured image by photographing the inside of the cooking chamber by using the camera 220 inside the cooking chamber. The captured image may be captured during a cooking process. The cooking apparatus 100 may start photographing the interior of the cooking chamber while starting a cooking operation. The cooking apparatus 100 may end photographing the inside of the cooking chamber, for example, when a cooking operation ends or when the door 310 is opened. The captured image may include a still image or a moving picture.

Next, in operation S404, the cooking apparatus 100 detects a fire hazard, based on the captured image. The cooking apparatus 100 may determine the fire hazard, based on color data of the captured image. The cooking apparatus 100 may identify at least one monitoring region, based on the color data of the captured image, and may determine whether a fire has occurred, based on a similarity between color data of the at least one monitoring region and the predefined fire-related color. The cooking apparatus 100 may calculate the similarity by comparing the predefined fire-related color with the color data of the at least one monitoring region. The predefined fire-related color may include a smoke-related color corresponding to smoke and a flame-related color corresponding to flame. The similarity may be determined based on a color coordinate distance between a color coordinate region of the fire-related color and the monitoring area, in the color space.

When it is determined in operation S404 that there is a fire hazard, the cooking apparatus 100 outputs a fire hazard notification, in operation S406. The fire hazard notification may include at least one of visual information or audio information. The fire hazard notification may include a message displayed through the display, a voice message output through the speaker, and the like. According to an embodiment of the disclosure, the fire hazard notification may include at least one of information indicating that a fire hazard has been detected, the type of fire hazard, response guide information, or cooking apparatus operation change information.

When a fire hazard is not detected in operation S404, the cooking apparatus 100 may perform operations S404 and S406, based on a next captured image.

According to an embodiment of the disclosure, when the captured image is a moving picture, operations S404 and S406 may be performed at predetermined frame intervals. For example, after starting a cooking operation, the cooking apparatus 100 may determine a fire hazard by performing operations S404 and S406 at intervals of 1 second.

According to an embodiment of the disclosure, when the captured image is a still image, the cooking apparatus 100 may determine a fire hazard by performing operations S404 and S406 whenever a still image is captured.

Figure 5:
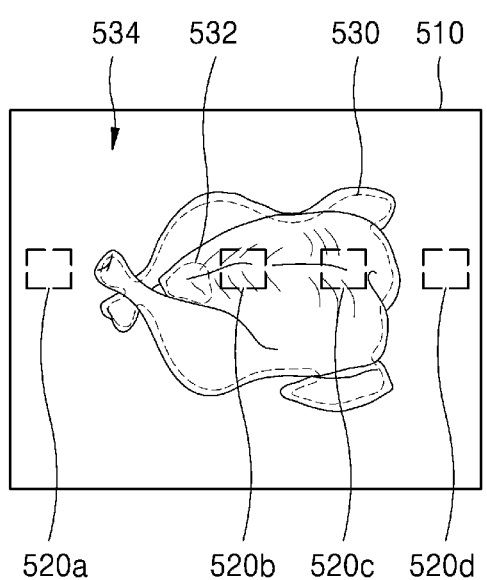
FIG. 5 illustrates a monitoring region according to an embodiment of the disclosure.

FIG. 5 illustrates a monitoring region according to an embodiment of the disclosure.

According to an embodiment of the disclosure, the cooking apparatus 100 may determine first, second, third, and fourth monitoring regions 520a, 520b, 520c, and 520d, respectively, based on the color data of a captured image 510. The first, second, third, and fourth monitoring regions 520a, 520b, 520c, and 520d, respectively, may be defined as regions having colors other than the fire-related color. The cooking apparatus 100 may extract color data of the first, second, third, and fourth monitoring regions 520a, 520b, 520c, and 520d, respectively, from a captured image captured during a cooking operation, and compare color data of the first, second, third, and fourth monitoring areas 520a, 520b, 520c, and 520d, respectively with the fire-related color to detect a fire hazard.

The cooking apparatus 100 may determine a monitoring region by using a captured image captured before the cooking operation starts. When the cooking operation starts, the colors of the ingredients change, and thus, the cooking apparatus 100 may determine the monitoring region by using the captured image captured before the cooking operation starts. The cooking apparatus 100 may determine the monitoring region and perform an operation of detecting a fire hazard, based on subsequent captured images.

In the example of FIG. 5, a first region 530 corresponds to a raw chicken, and is different from a flame-related color corresponding to a flame and similar to a smoke-related color corresponding to smoke. A second region 532 is a red region in the raw chicken, and is similar to the fire-related color and different from a smoke-related color. A third region 534 corresponds to a tray, and is different from the flame-related color and the smoke-related color.

According to an embodiment of the disclosure, the cooking apparatus 100 may set, as the monitoring region, a region different from the flame-related color and different from the smoke-related color. In the example of FIG. 5, the cooking apparatus 100 may select, as monitoring regions, the first monitoring region 520a and the fourth monitoring region 520d that are different from the flame-related color and different from the smoke-related color, and does not select the second monitoring region 520b and the third monitoring region 520c as the monitoring regions.

According to an embodiment of the disclosure, the cooking apparatus 100 may select a region different from the flame-related color as a flame monitoring region, and may set a region different from the smoke-related color as a smoke monitoring region. The cooking apparatus 100 may detect a flame, based on color data of the flame monitoring region. The cooking apparatus 100 may detect smoke, based on color data of the smoke monitoring region. In the example of FIG. 5, the cooking apparatus 100 may select the first monitoring region 520a, the second monitoring region 520b, the third monitoring region 520c, and the fourth monitoring region 520d as flame monitoring regions, and may select the first monitoring region 520a and the fourth monitoring region 520d as smoke monitoring regions.

The first, second, third, and fourth monitoring regions 520a, 520b, 520c, and 520d, respectively, may correspond to regions including one or more pixels.

According to an embodiment of the disclosure, the first, second, third, and fourth monitoring regions 520a, 520b, 520c, and 520d may be defined in the form of rectangular blocks. However, as understood by one of ordinary skill in the art, the monitoring region may be any suitable shape.

According to an embodiment of the disclosure, the first, second, third, and fourth monitoring regions 520a, 520b, 520c, and 520d, respectively, may be defined according to the edge of a specific object. For example, the first, second, third, and fourth monitoring regions 520a, 520b, 520c, and 520d, respectively, may be defined as regions corresponding to food ingredients.

The first, second, third, and fourth monitoring regions 520a, 520b, 520c, and 520d, respectively, may include a plurality of monitoring regions 520a, 520b, 520c, and 520d. According to an embodiment of the disclosure, the cooking apparatus 100 may set the plurality of monitoring areas 520a, 520b, 520c, and 520d, respectively, by selecting different color regions different from the fire-related color from the captured image 510. In the example of FIG. 5, the first monitoring region 520a may be a color corresponding to a tray, and the second monitoring region 520b may be a color corresponding to chicken, which is a food ingredient. As such, the cooking apparatus 100 may select regions having different colors in the captured image 510, as the first and second monitoring regions 520a and 520b, respectively.

According to an embodiment of the disclosure, the cooking apparatus 100 may set a plurality of monitoring regions including monitoring regions 520b and 520c corresponding to regions corresponding to food ingredients and monitoring regions 520a and 520d corresponding to the cooking apparatus 100 in the captured image. Since a flame is often caused in the food ingredient rather than another object such as a tray, the cooking apparatus 100 may set at least one region corresponding to the food ingredient as monitoring regions 520b and 520c. In one or more examples, since the color of the cooking apparatus 100 is already known to the cooking apparatus 100 and does not change during a cooking process, the cooking apparatus 100 may set at least one region corresponding to the color of the cooking apparatus 100 to the monitoring regions 520a and 520d. The at least one region corresponding to the color of the cooking apparatus 100 may include a region corresponding to a detachable tray used in the cooking apparatus 100.

According to an embodiment of the disclosure, the first, second, third, and fourth monitoring regions 520a, 520b, 520c, and 520d, respectively may be changed during the cooking process.

Figure 6:
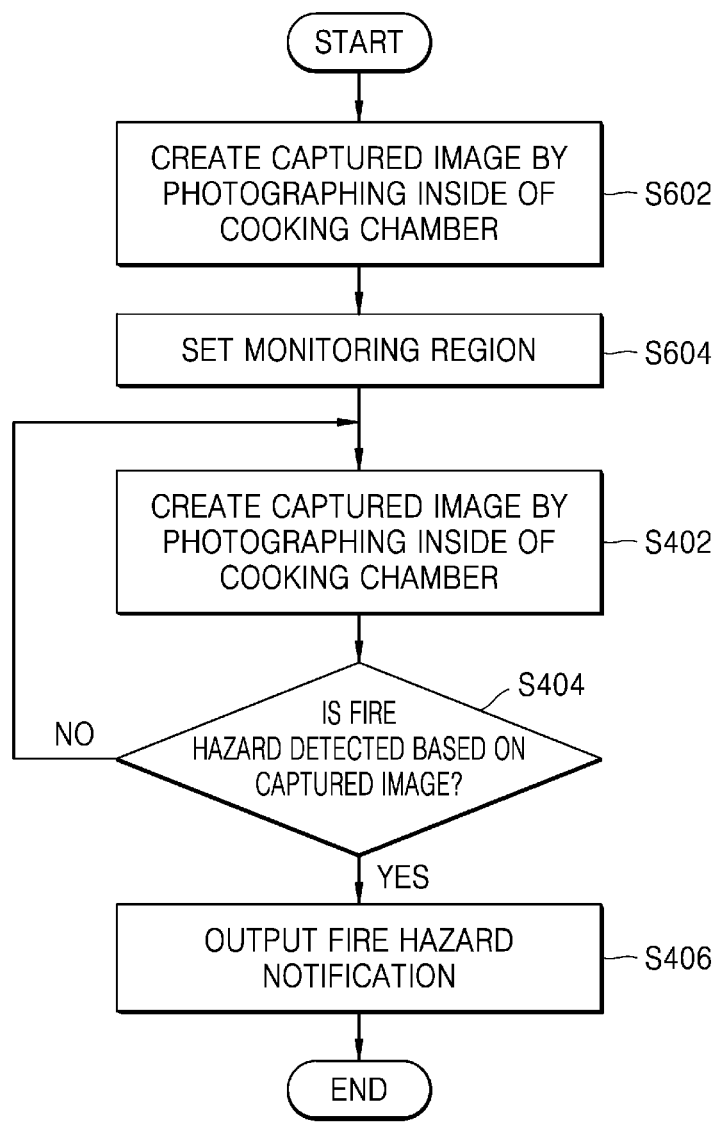
FIG. 6 is a flowchart of a method of controlling a cooking apparatus, according to an embodiment of the disclosure.

FIG. 6 is a flowchart of a method of controlling a cooking apparatus, according to an embodiment of the disclosure.

According to an embodiment of the disclosure, the cooking apparatus 100 may photograph the interior of the cooking chamber before the cooking operation starts, and may set a monitoring region, based on a captured image corresponding to a result of the photographing.

In operation S602, the cooking apparatus 100 creates the captured image by photographing the inside of the cooking chamber.

Next, in operation S604, the cooking apparatus 100 sets the monitoring region, based on the captured image.

When the monitoring region is determined, the cooking apparatus 100 repeats operations S402 and S404, and detects a fire hazard, based on the captured image.

Figure 7A:
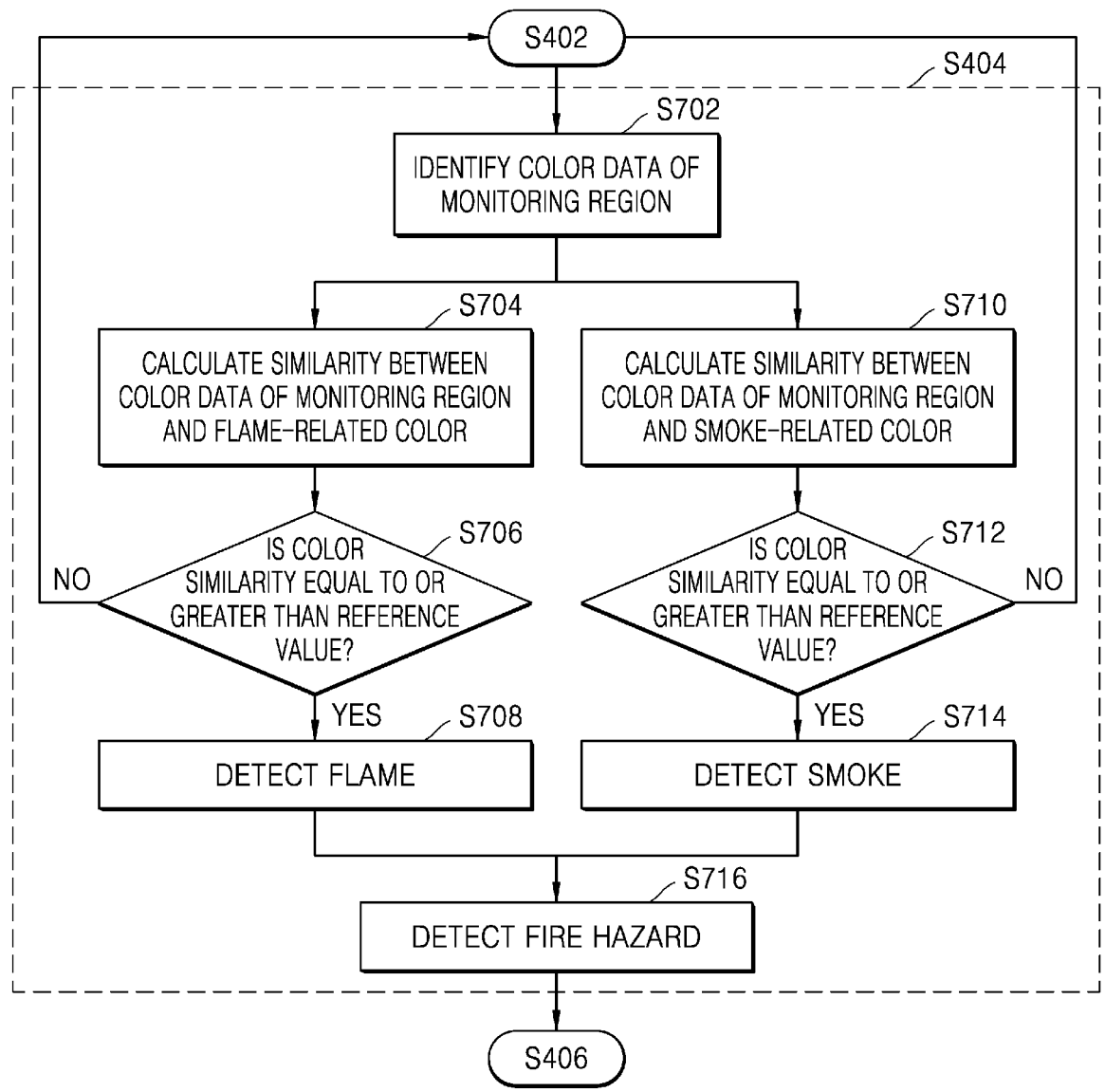
FIG. 7A is a flowchart illustrating a process of detecting a fire hazard, based on a captured image, according to an embodiment of the disclosure.

FIG. 7A is a flowchart illustrating a process of detecting a fire hazard based on the captured image, according to an embodiment of the disclosure.

FIG. 7B is a view illustrating a process of comparing a monitoring region with a fire-related color in a color space, according to an embodiment of the disclosure.

According to an embodiment of the disclosure, the cooking apparatus 100 determines whether there is a fire hazard, based on color data of the monitoring region. Details of operation S404 according to an embodiment of the disclosure will now be described with reference to FIG. 7A.

In operation S702, the cooking apparatus 100 identifies the color data of the monitoring region. When the monitoring region may include one pixel, the color data of the monitoring region corresponds to color data of the one pixel. When the monitoring region may include a plurality of pixels, the cooking apparatus 100 may identify an average value of color data of the plurality of pixels as the color data of the monitoring region.

The color data may be defined as color coordinates of a predetermined color space. For example, as shown in FIG. 7B, the color data may be defined in an RGB color space. The cooking apparatus 100 may decode the captured image to obtain an RGB image and obtain RGB color coordinates of each pixel. The color data of the monitoring region may be defined as first and second monitoring region color coordinates 720a and 720b on the color space.

The cooking apparatus 100 may define a fire color region corresponding to a fire-related color in the color space. The fire color region may include a flame color region 712 (e.g., red or orange related colors) and a smoke color region 714 (e.g., black, white, or grey related colors). The flame color region 712 and the smoke color region 714 may be defined as predetermined color coordinate regions on the color space. The flame color region 712 and the smoke color region 714 may be previously defined and stored in the memory 240.

The color data of the monitoring region may be defined in the color space. When there are two monitoring regions, the first monitoring region color coordinate 720a and the second monitoring region color coordinate 720b may be predetermined according to one or more settings. The cooking apparatus 100 may identify the first monitoring region color coordinate 720a corresponding to an average value of the color data of a first monitoring region. The cooking apparatus 100 may also identify the second monitoring region color coordinate 720b corresponding to an average value of the color data of a second monitoring region.

Next, in operation S704, the cooking apparatus 100 calculates a similarity between the color data of the monitoring region and the flame-related color region. The monitoring region in operation S704 may correspond to a flame monitoring region.

Referring to FIG. 7B, the cooking apparatus 100 calculates a distance between the first monitoring region color coordinate 720a and the flame color region 712 in the color space. According to an embodiment of the disclosure, the cooking apparatus 100 may calculate a distance between the first monitoring region color coordinate 720a and the center of the flame color region 712, according to a method defined as D2 in FIG. 7B in which a distance is calculated between two centers of two different regions. According to an embodiment of the disclosure, the cooking apparatus 100 may also calculate a distance 730a between the first monitoring region color coordinate 720a and the boundary of the flame color region 712, according to a method defined as D1 in FIG. 7B in which a distance is calculated between to peripheries of two different regions. When the distance 730a between the first monitoring region color coordinate 720a and the boundary of the flame color region 712 is calculated according to the method D2, the cooking apparatus 100 may obtain a distance 730a between the first monitoring region color coordinate 720a and a boundary point of the flame color region 712 that is closest to the first monitoring region color coordinate 720a.

In one or more examples, the cooking apparatus 100 may calculate a distance between the second monitoring region color coordinate 720b and the flame color region 712 in the color space.

An embodiment of calculating the similarity by calculating the distance 730a between the first monitoring region color coordinate 720a and the boundary of the flame color region 712 and a distance 730b between the second monitoring region color coordinate 720b and the boundary of the flame color region 712 according to the method of D2 of FIG. 7B will be mainly described in the disclosure. However, embodiments are not limited to these configurations, and an embodiment of calculating the similarity by calculating distances between the first and second monitoring region color coordinates 720a and 720b and the center of the flame color region 712 according to the method of D1 of FIG. 7B is not excluded.

The cooking apparatus 100 may calculate the similarity between the color data of the monitoring region and the flame-related color, based on the distances 730a and 730b on the color space. In one or more examples, similarity may be defined as the distances 730a and 730b themselves or may be defined as values calculated based on the distances 730a and 730b.

Next, in operation S706, the cooking apparatus 100 determines whether the color similarity is equal to or greater than a first reference value. When the color similarity is equal to or greater than the first reference value, the cooking apparatus 100 determines that a flame has been detected, in operation S708. When it is determined that a flame has been detected, the cooking apparatus 100 determines that a fire hazard has been detected, in operation S716.

In operation S710, the cooking apparatus 100 calculates a similarity between the color data of the monitoring region and the smoke-related color. In operation S710, the monitoring region in operation S710 may correspond to a smoke monitoring region.

Referring to FIG. 7B, the cooking apparatus 100 calculates a distance between the first monitoring region color coordinate 720a and the smoke color region 714 in the color space. According to an embodiment of the disclosure, the cooking apparatus 100 may calculate a distance between the first monitoring region color coordinate 720a and the center of the smoke color region 714, according to the method defined as D2 in FIG. 7B. According to an embodiment of the disclosure, the cooking apparatus 100 may also calculate a distance 732a between the first monitoring region color coordinate 720a and the boundary of the smoke color region 714 according to the method defined as D1 in FIG. 7B. When the distance 732a between the first monitoring region color coordinate 720a and the boundary of the smoke color region 714 is calculated according to the method D2 of FIG. 7B, the cooking apparatus 100 obtains a distance 732a between the first monitoring region color coordinate 720a and a boundary point of the smoke color region 714 that is closest to the first monitoring region color coordinate 720a.

In one or more examples, the cooking apparatus 100 may calculate a distance between the second monitoring region color coordinate 720b and the smoke color region 714 in the color space.

An embodiment of calculating the similarity by calculating the distance 732a between the first monitoring region color coordinate 720a and the boundary of the smoke color region 714 and a distance 732b between the second monitoring region color coordinate 720b and the boundary of the smoke color region 714 according to the method of D2 of FIG. 7B will be mainly described in the disclosure. However, the embodiments are not limited to these configurations, and an embodiment of calculating the similarity by calculating distances between the first and second monitoring region color coordinates 720a and 720b and the center of the smoke color region 714 according to the method of D1 of FIG. 7B is not excluded.

In one or more examples, the cooking apparatus 100 may calculate the similarity between the color data of the monitoring region and the smoke-related color, based on the distances 732a and 732b on the color space. The similarity may be defined as the distances 732a and 732b themselves or may be defined as values calculated based on the distances 732a and 732b.

Next, in operation S712, the cooking apparatus 100 determines whether the color similarity is equal to or greater than a second reference value. The second reference value is the same as or different from the first reference value described above. When the color similarity is equal to or greater than the second reference value, the cooking apparatus 100 determines that smoke has been detected, in operation S714. When it is determined that smoke has been detected, the cooking apparatus 100 determines that a fire hazard has been detected, in operation S716.

When a fire hazard is detected, the cooking apparatus 100 outputs a fire hazard notification in operation S406. The multimedia apparatus 100 may output the type of fire hazard. For example, the cooking apparatus 100 may output information indicating that flame has been detected, information indicating that smoke has been detected, or information indicating that flame and smoke have been detected.

Figure 8:
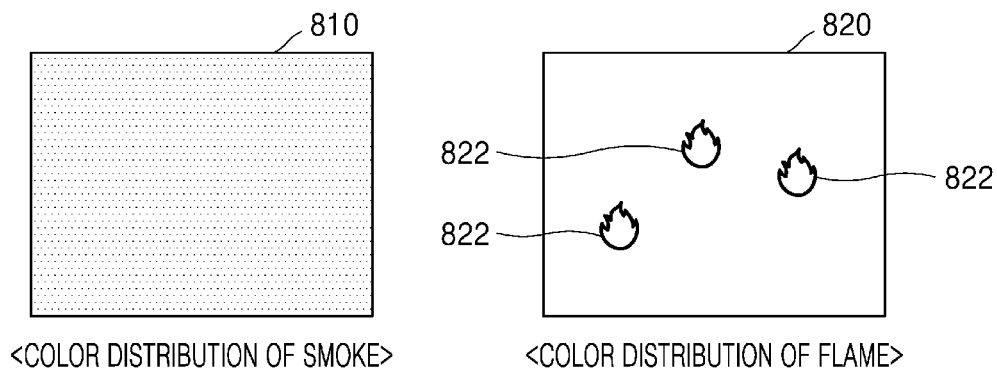
FIG. 8 illustrates a process of detecting smoke or flame, based on a color distribution, according to an embodiment of the disclosure.

FIG. 8 illustrates a process of detecting smoke or flame, based on a color distribution, according to an embodiment of the disclosure.

According to an embodiment of the disclosure, when further considering a color distribution 810 of the monitoring region corresponding to the smoke related color, the cooking apparatus 100 determines whether smoke has been detected. Since the cooking chamber 230 of the cooking apparatus 100 is a confined space, when smoke is produced by a fire, the inside of the cooking chamber 230 of the cooking apparatus 100 is likely to be filled with smoke. Therefore, when smoke is produced by a fire, the entire area of the captured image is likely to change to a color close to the smoke-related color. The cooking apparatus 100 may detect smoke by using a plurality of monitoring regions, and determine that smoke has been detected when a similarity to the smoke-related color in a predetermined percentage of the plurality of monitoring regions is high, for example, is equal to or greater than the second reference value).

According to an embodiment of the disclosure, the cooking apparatus 100 may determine whether a flame has been detected based on a consideration of a color distribution 820 of the monitoring region corresponding to the flame related color. When flame is produced in the cooking chamber 230 of the cooking apparatus 100, flames may be detected or seen sporadically. The cooking apparatus 100 may detect flames by using a plurality of monitoring regions, and may determine that the flame has been detected, and determine that smoke has been detected when a similarity to the flame-related color in a reference number or more of monitoring regions among the plurality of monitoring regions is high, for example, is equal to or greater than the first reference value. The reference number may correspond to, for example, 1 or a number greater than 1.

Figure 9:
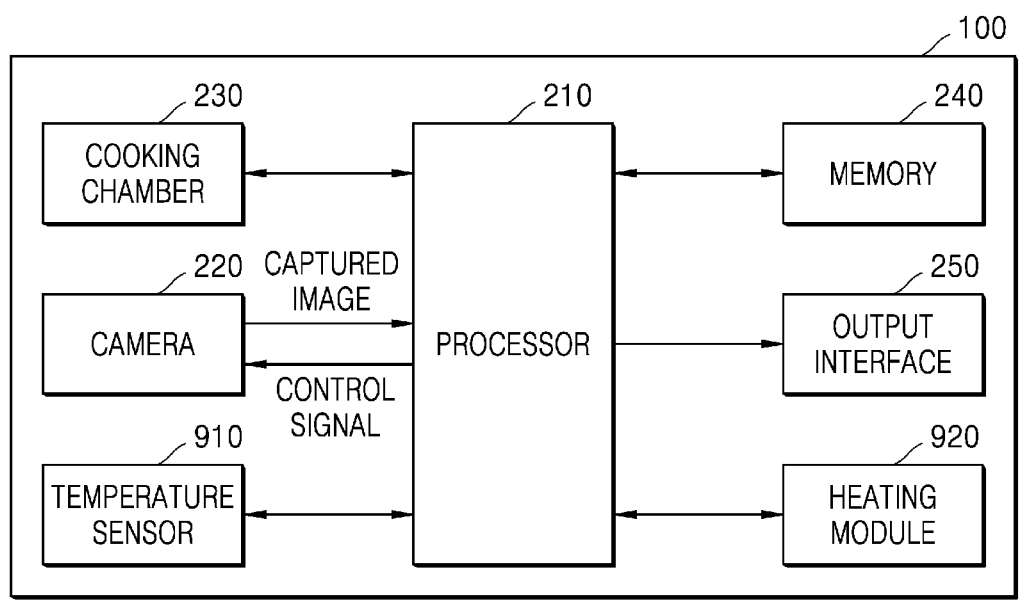
FIG. 9 is a block diagram of a structure of a cooking apparatus according to an embodiment of the disclosure.

FIG. 9 is a block diagram of a structure of a cooking apparatus according to an embodiment of the disclosure.

According to an embodiment of the disclosure, a cooking apparatus 100 may include a processor 210, a camera 220, a cooking chamber 230, a memory 240, an output interface 250, a temperature sensor 910, and a heating module 920. Differences from the cooking apparatus 100 of FIG. 2 will now mainly be described with reference to FIG. 9.

In one or more examples, the temperature sensor 910 may detect the temperature of the cooking chamber 230 of the cooking apparatus 100. The temperature sensor 910 may measure a temperature and convert the temperature into an electrical signal. The temperature sensor 910 may be installed inside the cooking chamber 230. The temperature sensor 910 outputs a measured temperature detection value to the processor 210.

The heating module 920 may control an internal temperature of the cooking chamber 230. The heating module 920 may include an electric heater or a gas burner, for example. The processor 210 may control the internal temperature of the cooking chamber 230 to a set temperature by controlling the heating module 920. Based on the temperature detection value detected by the temperature sensor 910, the processor 210 may increase the internal temperature of the cooking chamber 230 by using the heating module 920 or stop heating the heating module 920.

The processor 210 may determine a fire hazard based on the temperature detection value. When a fire hazard is detected based on the captured image, the processor 210 may additionally consider the temperature detection value to re-determine and verify the fire hazard.

When a fire hazard is detected based on the captured image, the processor 210 may determine whether the temperature detection value exceeds a reference temperature. The reference temperature is a predetermined value determined in advance.

According to an embodiment of the disclosure, the reference temperature may be changed according to a cooking progress time. The cooking apparatus 100 may control the internal temperature of the cooking chamber 230 by controlling the heating module 920 according to a predetermined cooking process. The cooking apparatus 100 determines that there is a risk of fire, when the temperature detection value is higher than a target temperature of temperature control. The reference temperature may be set to a value higher than the target temperature of temperature control. The cooking process may be determined based on detection of one or more ingredients or a user input indicating an item to be cooked.

According to an embodiment of the disclosure, the reference temperature may vary according to one or more food ingredients used in a cooking process. The reference temperature may be set differently according to the ignition point of a food ingredient. For example, the reference temperature may be set to be low for ingredients having a low ignition point, and the reference temperature may be set to be high for ingredients having a high ignition point.

Figure 10:
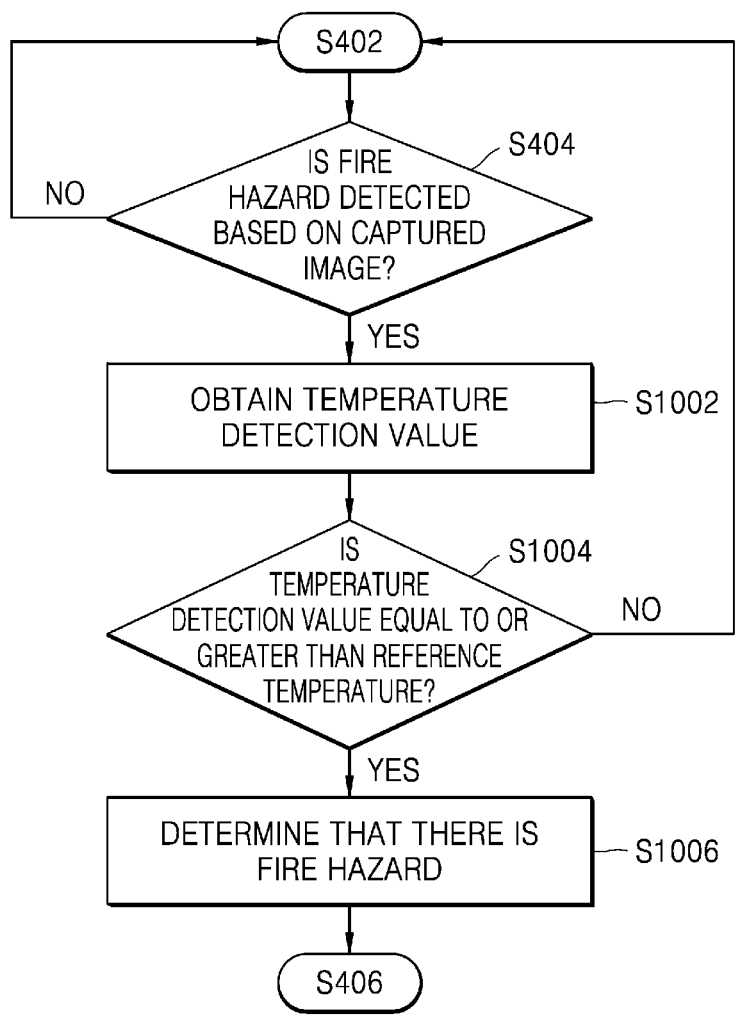
FIG. 10 is a flowchart of a process of detecting a fire hazard, based on a captured image and a temperature detection value, according to an embodiment of the disclosure.

FIG. 10 is a flowchart of a process of detecting a fire hazard, based on the captured image and the temperature detection value, according to an embodiment of the disclosure.

According to an embodiment of the disclosure, when a fire hazard is detected based on the captured image in operation S404, the cooking apparatus 100 obtains the temperature detection value from the temperature sensor 910, in operation S1002. The temperature sensor 910 detects the internal temperature of the cooking chamber 230 to generate the temperature detection value.

In operation S1004, the cooking apparatus 100 determines whether the temperature detection value is equal to or greater than a reference temperature. When the temperature detection value is equal to or greater than the reference temperature, the cooking apparatus 100 determines that there is a risk of fire, in operation S1006. When the temperature detection value is less than the reference temperature, the cooking apparatus 100 returns to operation S402 to obtain a next captured image.

Figure 11:
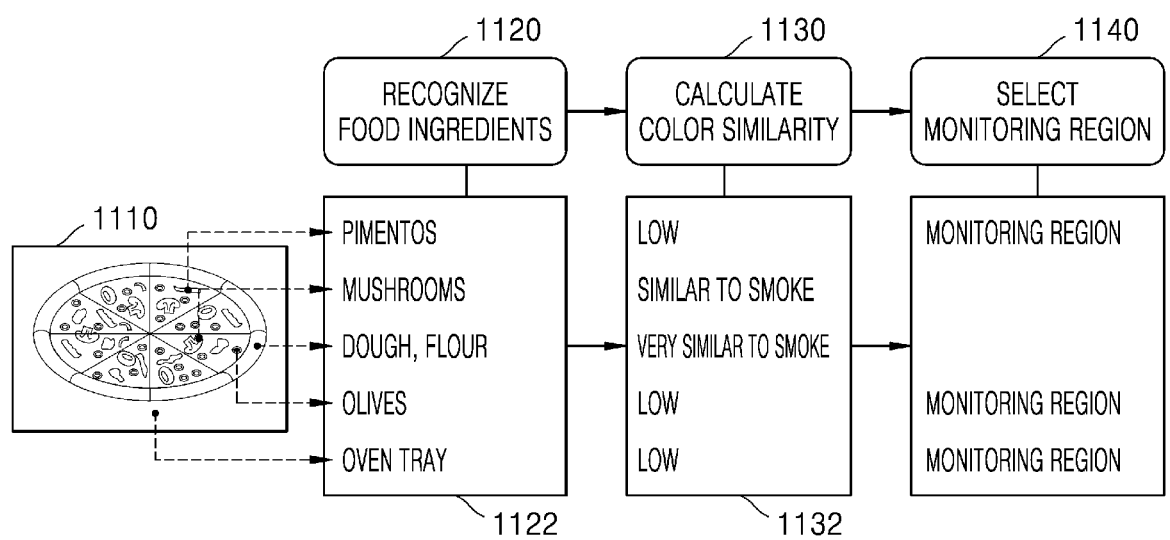
FIG. 11 illustrates a process of recognizing food ingredients from a captured image and determining a monitoring region, according to an embodiment of the disclosure.

FIG. 11 illustrates a process of recognizing food ingredients from a captured image and determining a monitoring region, according to an embodiment of the disclosure.

According to an embodiment of the disclosure, the cooking apparatus 100 may recognize food ingredients from a captured image 1110, and determine a monitoring region according to a result of the recognition of the food ingredients.

The cooking apparatus 100 may recognize food ingredients from the captured image 1110 (1120). The cooking apparatus 100 may recognize food ingredients by performing object recognition on the captured image 1110. The cooking apparatus 100 may perform food ingredient recognition to recognize at least one of the type of food ingredient, the color of the food ingredient, the position of the food ingredient, or the edge of the food ingredient. The cooking apparatus 100 may recognize food ingredients from the captured image 1110 to create a food ingredient recognition result 1122.

In the example of FIG. 11, the captured image 1110 is an image obtained by photographing the inside of the cooking chamber 230 while pizza is being cooked. The cooking apparatus 100 recognized pimentos, mushrooms, dough, flour, and olives from the captured image 1110 by performing food ingredient recognition on the captured image 1110. The cooking apparatus 100 also recognizes a finishing material or tray of the cooking chamber 230. In the example of FIG. 11, the cooking apparatus 100 recognizes an oven tray from the captured image 1110.

Figure 12:
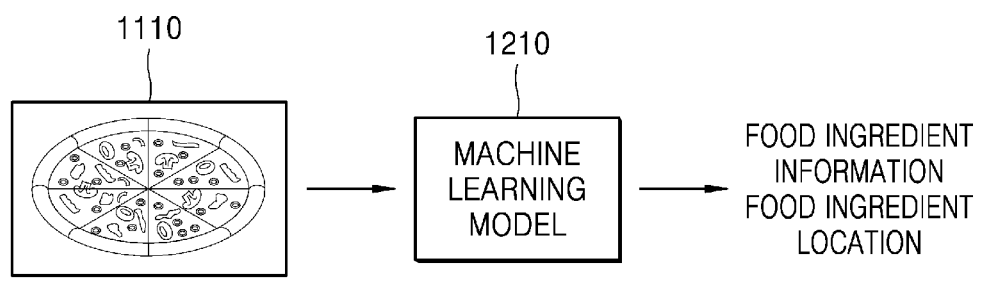
FIG. 12 is a diagram illustrating a structure of recognizing food ingredients by using a machine learning model, according to an embodiment of the disclosure.

FIG. 12 is a diagram illustrating a structure of recognizing food ingredients by using a machine learning model, according to an embodiment of the disclosure.

According to an embodiment of the disclosure, the cooking apparatus 100 may recognize food ingredient information and food ingredient locations from the captured image 1110 by using a machine learning model 1210. The food ingredient information may include the types of food ingredients and the colors of the food ingredients. The food ingredient locations represent regions corresponding to the food ingredients in the captured image 1110. The food ingredient locations may include edge information corresponding to the food ingredients.

In one or more examples, the machine learning model 1210 may be a model that is machine-learned by training data including a plurality of captured images as input data and a plurality of pieces of food ingredient information and a plurality of food ingredient locations as output data. The machine learning model 1210 may use an algorithm such as a convolutional neural network (CNN), a region-based convolutional neural network (R-CNN), you only look once (YOLO), or a single shot detector (SSD), or any other neural network model known to one of ordinary skill in the art.

According to an embodiment of the disclosure, the cooking apparatus 100 may use the machine learning model 1210 according to a On-Device method. The memory 240 may store instructions of the machine learning model 1210, and the processor 210 may execute the machine learning model 1210 by executing the instructions of the machine learning model 1210 stored in the memory 240.

According to an embodiment of the disclosure, the cooking apparatus 100 may obtain a food ingredient recognition result by using the machine learning model 1210 executed in an external server. The cooking apparatus 100 may transmit the captured image 1110 to the external server and request food ingredient recognition. The external server may input the captured image 1110 to the machine learning model 1210 to obtain the food ingredient information and the food ingredient locations. The external server may transmit the obtained food ingredient information and the obtained food ingredient locations to the cooking apparatus 100.

Operations next to the food ingredient recognition 1120 will be described by referring back to FIG. 11.

In one or more examples, the cooking apparatus 100 may calculate a color similarity with the fire-related color based on food ingredient types and food ingredient colors recognized from the captured image 1110 (1130). As described above with reference to FIGS. 7A and 7B, the color similarity may be calculated based on a distance between a coordinate region of the fire-related color and a color coordinate of a recognized food ingredient color in a color space.

According to an embodiment of the disclosure, the cooking apparatus 100 may calculate a color similarity between the recognized food ingredient color and the smoke-related color. The cooking apparatus 100 calculates a color similarity between the recognized food ingredient color and the flame-related color.

The cooking apparatus 100 may calculate the color similarity to create a color similarity calculation result 1132. The color similarity calculation result 1132 may be defined as low, similar to smoke, very similar to smoke, similar to flame, very similar to flame, or any other suitable similarity category.

Next, the cooking apparatus 100 may select the monitoring region, based on the color similarity calculation result 1132 (1140).

According to an embodiment of the disclosure, the cooking apparatus 100 may select, as the monitoring region, a food ingredient region having a low color similarity with respect to a fire-related color. The cooking apparatus 100 may select, as the monitoring region, a food ingredient region having low similarities to the fire-related color and the smoke-related color. In the example of FIG. 11, the cooking apparatus 100 may select, as monitoring regions, regions corresponding to pimentos, olives, and an oven tray having low similarities to the fire-related color.

According to an embodiment of the disclosure, the cooking apparatus 100 may select a food ingredient region having a low color similarity to the smoke-related color as a smoke monitoring region, and may select a food ingredient region having a low color similarity to the flame-related color as a flame monitoring region. In the example of FIG. 11, the cooking apparatus 100 may select, as smoke monitoring regions, regions corresponding to pimentos, olives, and an oven tray having low similarities to the smoke-related color. The cooking apparatus 100 may select, as flame monitoring regions, regions corresponding to pimentos, olives, and an oven tray having low similarities to the flame-related color.

According to an embodiment of the disclosure, the cooking apparatus 100 may set, as the monitoring region, all regions corresponding to food ingredients selected as monitoring regions. In this case, all pixels corresponding to the food ingredients selected as monitoring regions may be set as the monitoring region.

According to an embodiment of the disclosure, the cooking apparatus 100 may set, as the monitoring region, one or more regions corresponding to food ingredients selected as monitoring regions. For example, the cooking apparatus 100 may set a rectangular block including some pixels among pixels corresponding to pimentos, as a monitoring region. For example, the cooking apparatus 100 may set, as a monitoring region, pixels of a center region of each pimento excluding an edge region of each pimento, among the pixels corresponding to pimentos. As understood by one of ordinary skill in the art, the monitoring region may be any suitable shape other than a rectangular block.

Figure 13:
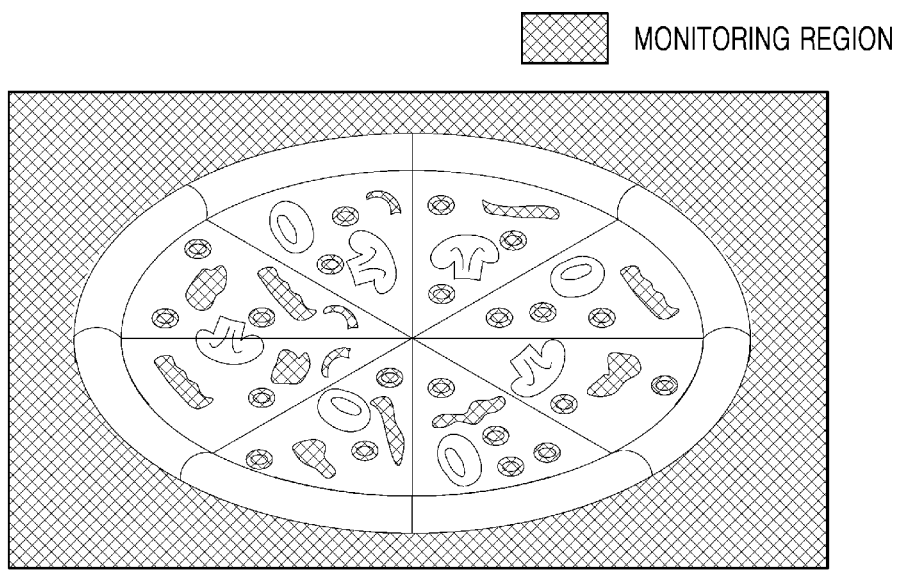
FIG. 13 illustrates a set monitoring region according to an embodiment of the disclosure.

FIG. 13 illustrates a set monitoring region according to an embodiment of the disclosure.

According to an embodiment of the disclosure, the cooking apparatus 100 may define, as a monitoring region, a pixel region corresponding to a food ingredient having a low color similarity to the fire-related color. The cooking apparatus 100 may create a mask in which pixels corresponding to the monitoring region have a value of 1 and the remaining pixels have a value of 0. The cooking apparatus 100 may extract the monitoring region by using the mask.

According to an embodiment of the disclosure, a mask for a smoke monitoring region and a mask for a flame monitoring region may be separately created.

The cooking apparatus 100 may determine a monitoring region before starting a cooking operation, and may create a mask corresponding to the monitoring region. The cooking apparatus 100 stores the mask corresponding to the monitoring region in the memory 240, and extracts color data of the monitoring region by using the mask.

Figure 14:
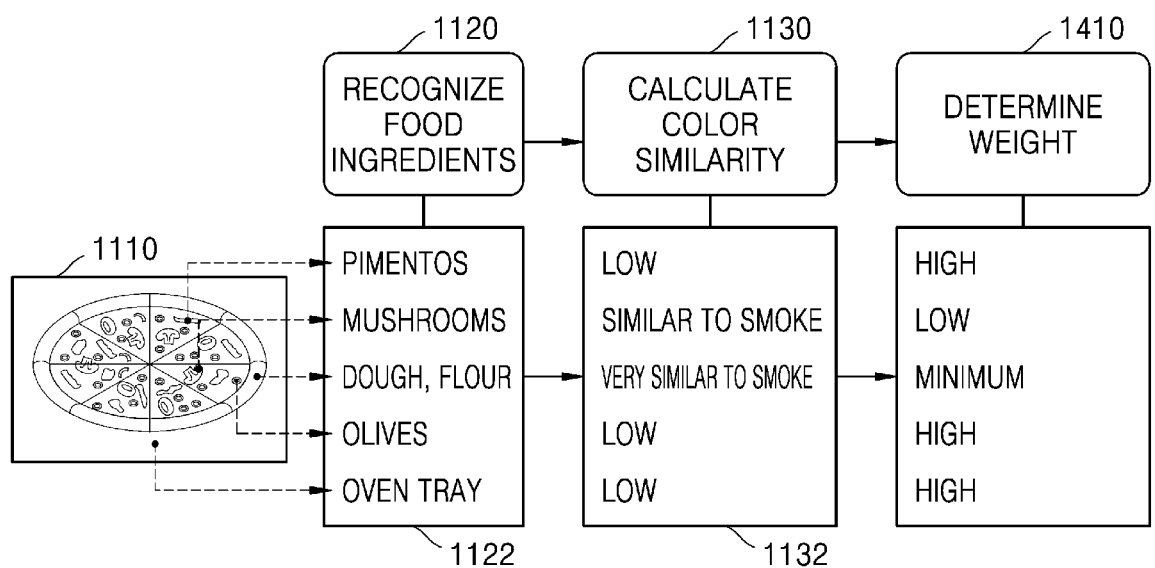
FIG. 14 is a block diagram illustrating a process of applying one or more weights to a monitoring region, according to an embodiment of the disclosure.

FIG. 14 is a block diagram illustrating a process of applying a one or more weights to a monitoring region, according to an embodiment of the disclosure.

According to an embodiment of the disclosure, the cooking apparatus 100 may recognize food ingredients (1120), calculate color similarities between the recognized food ingredients and the fire-related color (1130), and apply a weight to each pixel region, based on the color similarities.

In one or more examples, the cooking apparatus 100 may recognize food ingredients from the captured image 1110 (1120). The cooking apparatus 100 may recognize food ingredients by performing object recognition on the captured image 1110. The cooking apparatus 100 may perform food ingredient recognition to recognize the types of food ingredients, the colors of the food ingredients, the positions of the food ingredients, and the edges of the food ingredients. The cooking apparatus 100 may recognize food ingredients from the captured image 1110 to create a food ingredient recognition result 1122.

The cooking apparatus 100 may calculate a color similarity with the fire-related color, based on food ingredient types and food ingredient colors recognized from the captured image 1110 (1130). As described above with reference to FIGS. 7A and 7B, the color similarity may be calculated based on a distance between a coordinate region of the fire-related color and a color coordinate of a recognized food ingredient color in a color space.

According to an embodiment of the disclosure, the cooking apparatus 100 may calculate a color similarity between the recognized food ingredient color and the smoke-related color. The cooking apparatus 100 may calculate a color similarity between the recognized food ingredient color and the flame-related color.

The cooking apparatus 100 may calculate the color similarity to generate a color similarity calculation result 1132. The color similarity calculation result 1132 may be defined as low, similar to smoke, very similar to smoke, similar to flame, very similar to flame, or any other suitable color similarity category.

Next, the cooking apparatus 100 may determine the weight of each pixel region based on the color similarity calculation result 1132 (1410). In one or more examples, in the color similarity calculation result 1132, the cooking apparatus 100 may assign a high weight to food ingredients having a low color similarity and assign a low weight to food ingredients having a high color similarity. The cooking apparatus 100 may create a weight map according to color similarities, and obtain fire-related indexes related to the color similarities based on the weight map. The cooking apparatus 100 may determine a color similarity with color data of each pixel and the fire-related color. The cooking apparatus 100 may apply a weight to the color similarity value of each pixel by multiplying the color similarity value of each pixel by the weight map. The cooking apparatus 100 may define, as a fire related index, a sum of values obtained by applying weights to the respective color similarity values of the pixels. When the fire related index is equal to or greater than a reference value, the cooking apparatus 100 may determine that a fire hazard has been detected.

In the example of FIG. 14, pimentos, olives, and an oven tray are determined to have low color similarities and thus have high weights. Mushrooms are determined to have a high color similarity with smoke and have a low weight. Dough and flour are determined to have a very high color similarity with smoke, and the weight is defined as a lowest value. The lowest value of the weight may be, for example, 0.

According to an embodiment of the disclosure, the cooking apparatus 100 may differently set a flame weight for a flame related color and a smoke weight for a smoke related color.

According to an embodiment of the disclosure, the cooking apparatus 100 may calculate a similarity to the flame-related color, and calculate the flame weight, based on the similarity to the flame-related color. The cooking apparatus 100 may assign a high weight to food ingredients having a low color similarity and assign a low weight to food ingredients having a high color similarity to a result of the calculation of the similarity to the flame-related color. The cooking apparatus 100 may generate a flame weight map according to color similarities, and obtain flame-related indexes related to the color similarities for flame based on the flame weight map. The cooking apparatus 100 may determine a color similarity with color data of each pixel and the flame-related color. The cooking apparatus 100 may apply a flame weight to the color similarity value of each pixel. The cooking apparatus 100 may apply a flame weight by multiplying the color similarity value of each pixel by the flame weight map. The cooking apparatus 100 may define, as a flame related index, a sum of values obtained by applying flame weights to the respective color similarity values of the pixels. In one or more examples, when the flame related index is equal to or greater than a reference value, the cooking apparatus 100 determines that a fire hazard has been detected.

According to an embodiment of the disclosure, the cooking apparatus 100 may calculate a similarity to the smoke-related color, and calculate the smoke weight, based on the similarity to the smoke-related color. The cooking apparatus 100 may assign a high weight to food ingredients having a low color similarity and assign a low weight to food ingredients having a high color similarity to a result of the calculation of the similarity to the smoke-related color. The cooking apparatus 100 may create a smoke weight map according to color similarities, and obtain smoke-related indexes related to the color similarities for smoke, based on the smoke weight map. The cooking apparatus 100 may determine a color similarity with color data of each pixel and the smoke-related color. The cooking apparatus 100 may apply a smoke weight to the color similarity value of each pixel. The cooking apparatus 100 may apply a smoke weight by multiplying the color similarity value of each pixel by the smoke weight map. The cooking apparatus 100 may define, as a smoke related index, a sum of values obtained by applying smoke weights to the respective color similarity values of the pixels. When the smoke related index is equal to or greater than a reference value, the cooking apparatus 100 determines that a fire hazard has been detected.

Figure 15:
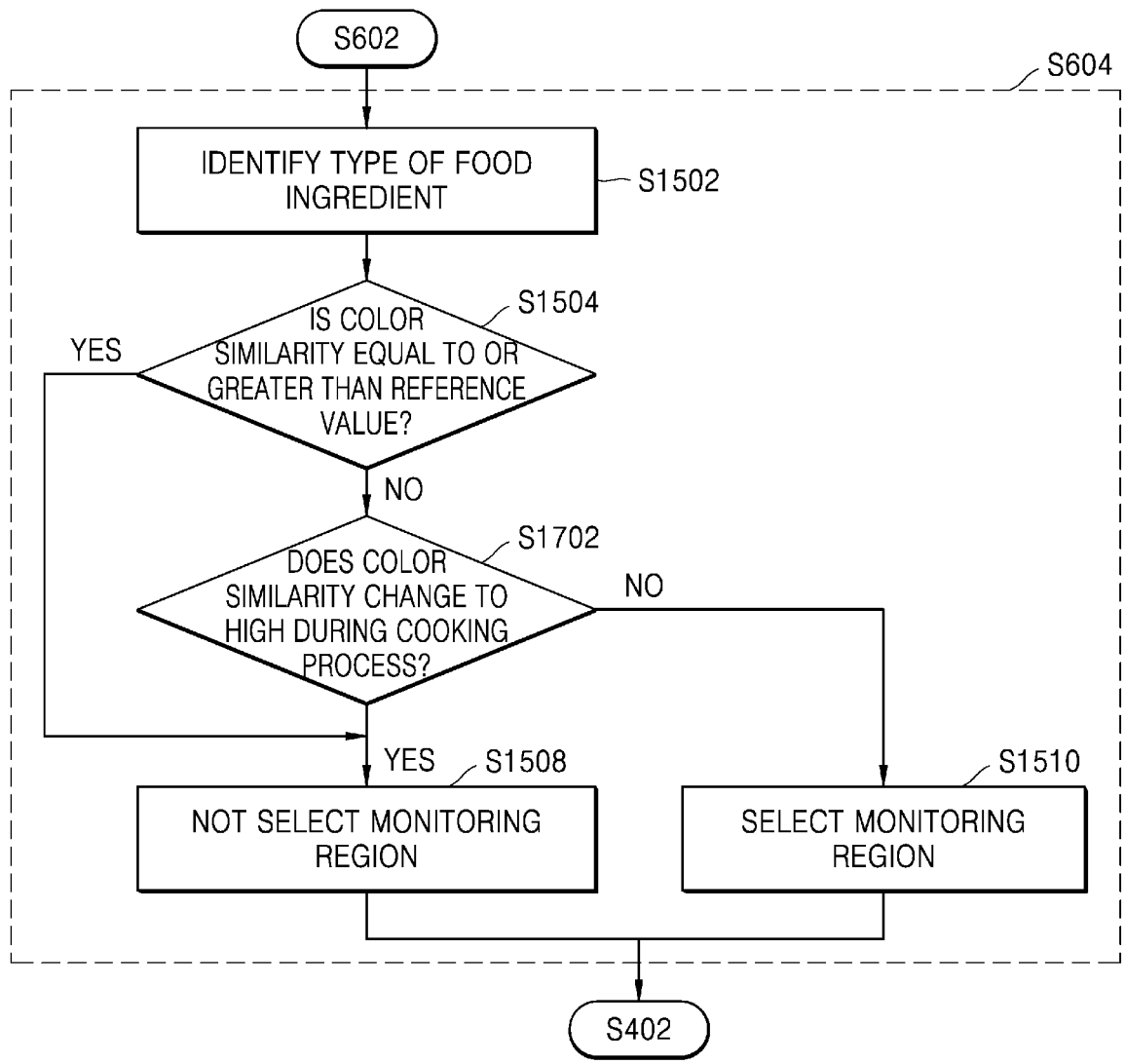
FIG. 15 is a flowchart of a process of selecting a monitoring region, according to an embodiment of the disclosure.

FIG. 15 is a flowchart of a process of selecting a monitoring region, according to an embodiment of the disclosure.

According to an embodiment of the disclosure, the cooking apparatus 100 may select a monitoring region based on variations in color of food ingredients during a cooking process. The food ingredients may change in color while the food is boiled during the cooking process. For example, beef or pork may have a red color before cooking, and may change to a color close to white by being cooked by the cooking apparatus 100. In this case, beef or pork has a color with a high color similarity to smoke in a cooked state. Accordingly, even when a color similarity to the fire-related color is low before cooking, when the color similarity to the fire-related color is high after cooking, the cooking apparatus 100 may not select the food ingredient as the monitoring region, thereby reducing the risk of a false detection of smoke or a fire hazard.

In operation S1502, the cooking apparatus 100 may identify the type of food ingredient from a captured image. As described above, the cooking apparatus 100 may identify the type of food ingredient from the captured image by using an object recognition algorithm. The cooking apparatus 100 may identify the type of food ingredient from the captured image by using a machine-learning model.

When a plurality of types of food ingredients are identified from the captured image, the cooking apparatus 100 may perform operations S1504, S1506, S1508, and S1510 for each type of food ingredient.

In operation S1504, the cooking apparatus 100 determines whether a color similarity between a recognized food ingredient and the fire-related color is equal to or greater than a reference value. According to an embodiment of the disclosure, the cooking apparatus 100 may calculate a color similarity between the flame-related color and color data of a food ingredient region of the captured image. According to an embodiment of the disclosure, the cooking apparatus 100 may calculate a color similarity between the smoke-related color and the color data of the food ingredient region of the captured image.

When the color similarity is equal to or greater than a reference value, the cooking apparatus 100 does not select the food ingredient region as the monitoring region, in operation S1508.

When the color similarity is less than the reference value, the cooking apparatus 100 determines whether the color similarity of the food ingredient to the fire-related color changes to high during a cooking process, in operation S1506. For example, in the case of beef or pork, a color similarity to the fire-related color is low before cooking begins, but a color similarity to the smoke-related color is high after cooking. The cooking apparatus 100 may previously store information about food ingredients of which color similarities with the fire-related color highly change during a cooking process. For example, the cooking apparatus 100 may store, in the memory 240, information about food ingredients of which color similarities with the flame-related color highly change during a cooking process and information about food ingredients of which color similarities with the smoke-related color highly change during a cooking process. By using the information stored in the memory 240, the cooking apparatus 100 determines whether the color similarity of the food ingredient to the fire-related color changes high while the food ingredient is being cooked.

When it is determined in operation S1506 that the color similarity of the food ingredient to the fire-related color changes high while the food ingredient is being cooked, the cooking apparatus 100 does not select a region corresponding to the food ingredient as the monitoring region, in operation S1508. When it is determined in operation S1506 that the color similarity of the food ingredient to the fire-related color does not change high while the food ingredient is being cooked, the cooking apparatus 100 selects the region corresponding to the food ingredient as the monitoring region, in operation S1510.

When the monitoring region is determined in operation S604, the cooking apparatus 100 creates the captured image by photographing the inside of the cooking chamber, in operation S402.

Figure 16:
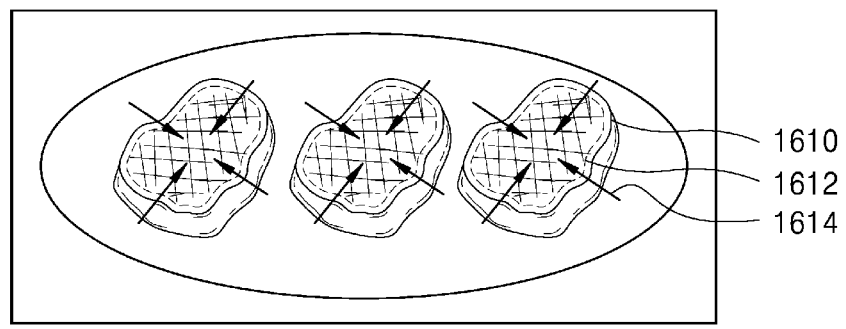
FIG. 16 is a view illustrating shrinkage of a food ingredient, according to an embodiment of the disclosure.

FIG. 16 is a view illustrating shrinkage of a food ingredient, according to an embodiment of the disclosure.

According to an embodiment of the disclosure, the cooking apparatus 100 may determine a monitoring region in consideration of the shrinkage of the food ingredient.

The food ingredient may shrink as moisture is removed during the cooking process and boiling progresses. For example, meat shrinks during cooking. For example, as shown in FIG. 16, the edge of meat moves from a first edge 1610 before cooking to a second edge 1612 due to shrinkage 1614 during the cooking process. As another example, certain plants such as spinach shrink during the cooking process.

Figure 17:
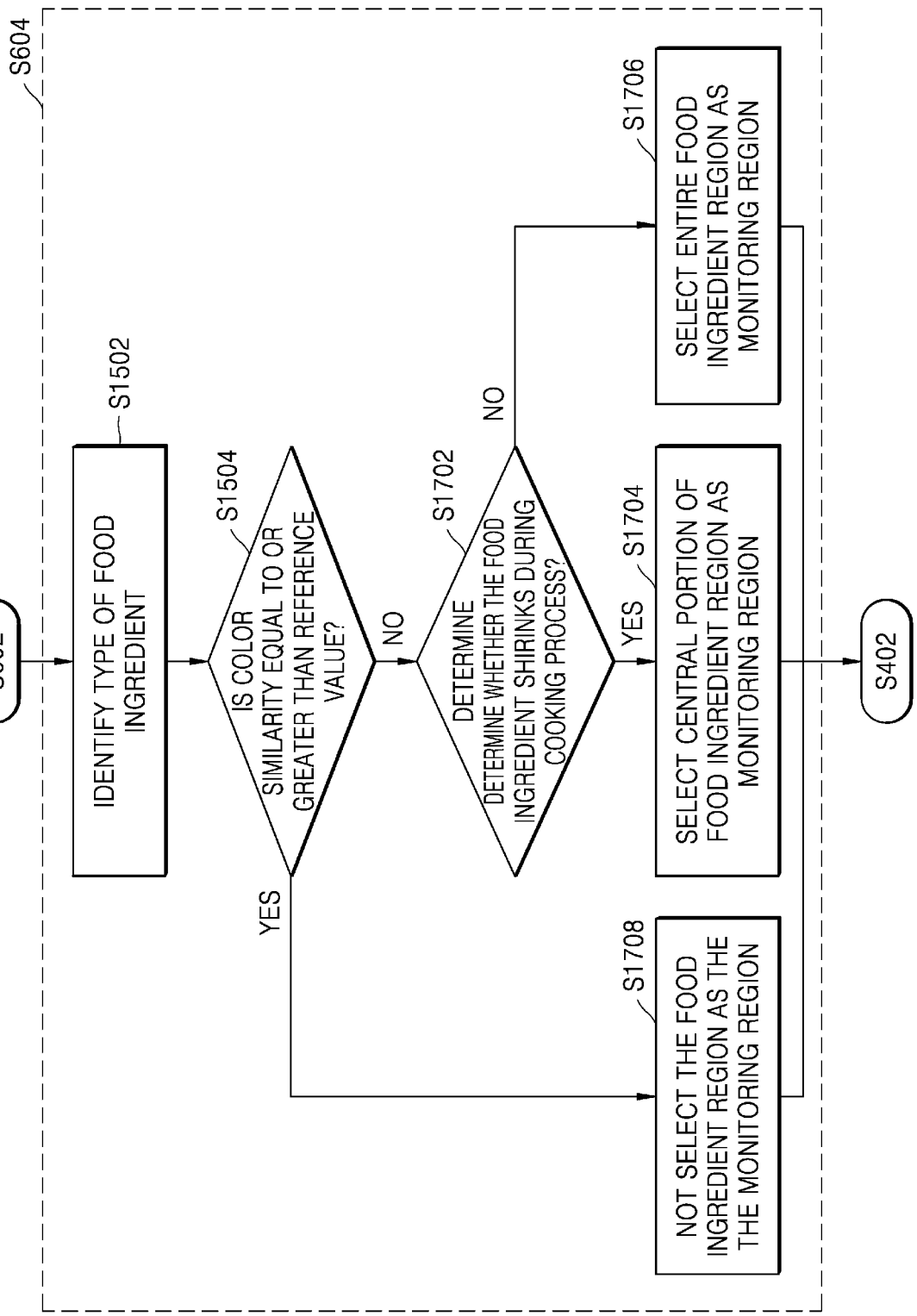
FIG. 17 is a flowchart of a process of determining a monitoring region in consideration of shrinkage of a food ingredient, according to an embodiment of the disclosure.

According to embodiments of the disclosure, a monitoring region is determined in consideration of a change in a food ingredient during a cooking process. In order to prevent the monitoring region from being changed from a region corresponding to the food ingredient to a region not corresponding to the food ingredient due to shrinkage of the food ingredient during the cooking process, the cooking apparatus 100 may exclude an edge region of the food ingredient from the monitoring region and determine a center region of the food ingredient as the monitoring region, FIG. 17 is a flowchart of a process of determining a monitoring region in consideration of shrinkage of a food ingredient, according to an embodiment of the disclosure.

First, in operation S1502, the cooking apparatus 100 identifies the type of food ingredient from a captured image. As described above, the cooking apparatus 100 may identify the type of food ingredient from the captured image by using an object recognition algorithm. The cooking apparatus 100 may identify the type of food ingredient from the captured image by using a machine-learning model.

When a plurality of types of food ingredients are identified from the captured image, the cooking apparatus 100 may perform operations S1504, S1702 S1704, S1706, and S1708 for each type of food ingredient.

In operation S1504, the cooking apparatus 100 determines whether a color similarity between a recognized food ingredient and the fire-related color is equal to or greater than a reference value. According to an embodiment of the disclosure, the cooking apparatus 100 may calculate a color similarity between the flame-related color and color data of a food ingredient region of the captured image. According to an embodiment of the disclosure, the cooking apparatus 100 may calculate a color similarity between the smoke-related color and the color data of the food ingredient region of the captured image.

When the color similarity is equal to or greater than a reference value, the cooking apparatus 100 does not select the food ingredient region as the monitoring region, in operation S1708.

When the color similarity is less than the reference value, the cooking apparatus 100 determines whether the identified food ingredient shrinks during a cooking process, in operation S1702. For example, meat or vegetables shrink as the meat or vegetables are cooked during a cooking process. The cooking apparatus 100 may previously store information about a food ingredient that shrinks during a cooking process. For example, the cooking apparatus 100 stores information about a food ingredient that shrinks in the memory 240, and determines whether the recognized food ingredient is a food that shrinks during a cooking process, by using the information stored in the memory 240.

When it is determined in operation S1702 that the recognized food ingredient is a food ingredient that shrinks during a cooking process, the cooking apparatus 100 excludes an edge region from a region corresponding to the recognized food ingredient and selects the central portion of the food ingredient region as a monitoring region, in operation S1704. A detailed example of selecting a monitoring region of a food ingredient that shrinks during a cooking process is described with reference to FIG. 16. When a food ingredient is expected to shrink from the first edge 1610 to the second edge 1614 during a cooking process, the cooking apparatus 100 excludes an edge area between the first edge 1610 and the second edge 1614 from the monitoring region, and sets a central region of the second edge 1614 as the monitoring region.

According to an embodiment of the disclosure, when the food ingredient is a food ingredient that shrinks during a cooking process, the cooking apparatus 100 may previously store information about a shrinkage ratio. For example, the cooking apparatus 100 may previously store information about a shrinkage ratio for the food ingredient that shrinks during a cooking process, according to three categories of high, middle, and low. As understood by one of ordinary skill in the art, the number of categories may set to any suitable number. The cooking apparatus 100 may adjust the edge region excluded from the monitoring region from the food ingredient region according to the shrinkage ratio. When the shrinkage ratio is high, the cooking apparatus 100 sets, as a first ratio, the ratio of the edge region to the entire food ingredient region to be high. When the shrinkage ratio is middle, the cooking apparatus 100 sets, as a second ratio, the ratio of the edge region to the entire food ingredient region to be middle. When the shrinkage ratio is low, the cooking apparatus 100 sets, as a third ratio, the ratio of the edge region to the entire food ingredient region to be low. The first ratio, the second ratio, and the third ratio may be designated in advance.

When it is determined in operation S1702 that the food ingredient does not shrink during the cooking process, the cooking apparatus 100 selects the entire food ingredient region as a monitoring region, in operation S1706. However, according to an embodiment of the disclosure, even in the case of a food ingredient in which shrinkage does not occur, the monitoring region may exclude the edge region among the food ingredient region. The edge region set in operation S1706 may be set to be narrower than the edge region, which is excluded for the food ingredient in which shrinkage occurs in operation S1704.

When the monitoring region is determined in operation S604, the cooking apparatus 100 creates the captured image by photographing the inside of the cooking chamber, in operation S402.

Figure 18:
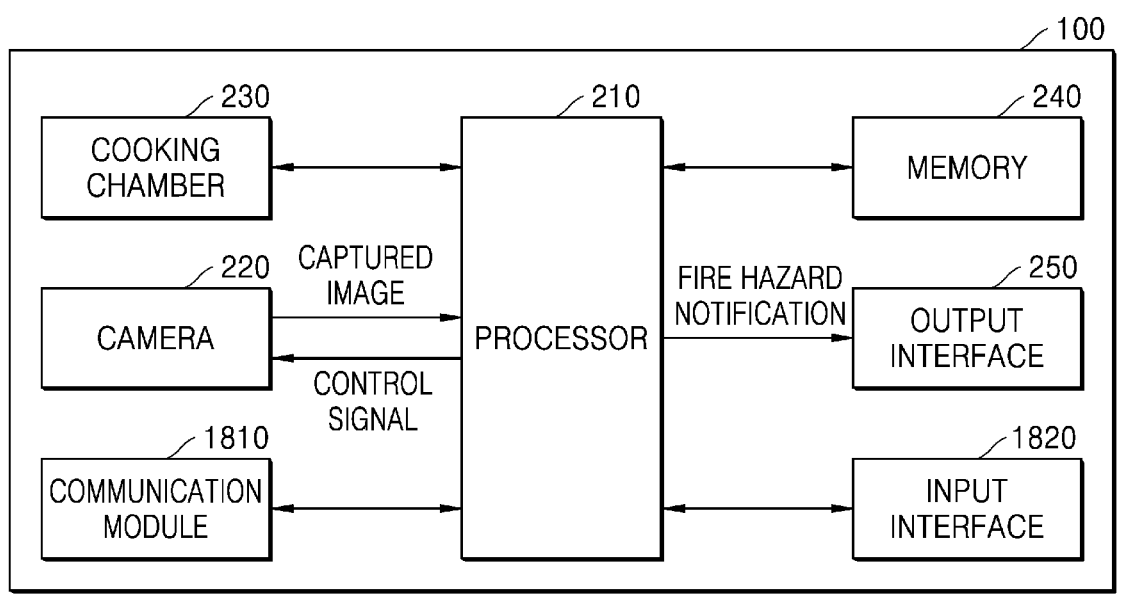
FIG. 18 is a block diagram of a structure of a cooking apparatus according to an embodiment of the disclosure.

FIG. 18 is a block diagram of a structure of a cooking apparatus according to an embodiment of the disclosure.

According to an embodiment of the disclosure, a cooking apparatus 100 may obtain food ingredient information, based on an external input or a user input. The cooking apparatus 100 may obtain the food ingredient information through a communication module 1810 or an input interface 1820.

According to an embodiment of the disclosure, a cooking apparatus 100 may include a processor 210, a camera 220, a cooking chamber 230, a memory 240, an output interface 250, the communication module 1810, and then input interface 1820. Differences from the cooking apparatus 100 of FIG. 2 will now mainly be described with reference to FIG. 18.

The communication module 1810 may communicate with an external device such as a server, a mobile device, or a user apparatus, by wire or wirelessly. The communication module 1810 may access an access point (AP) device to transmit/receive a Wi-Fi signal. The processor 210 may control transmit/receive operations of the communication module 1810.

The communication module 1810 may include a wireless communication module (e.g., a cellular communication module, a short-range wireless communication module, or a global navigation satellite system (GNSS) communication module), or a wired communication module (e.g., a local area network (LAN) communication module or a power line communication module). The communication module 1810 may perform short-range communication, and may use, for example, Bluetooth, Bluetooth Low Energy (BLE), Near Field Communication, WLAN (Wi-Fi), Zigbee, Infrared Data Association (IrDA) communication, Wi-Fi Direct (WFD), ultrawideband (UWB), or Ant+ communication. For example, the communication module 1810 may perform long-distance communication, for example, may communicate with an external device through a legacy cellular network, a 5G network, a next-generation communication network, the Internet, or a computer network (e.g., LAN or WAN).

For example, the communication module 1810 may use mobile communication, and may exchange a wireless signal with at least one of a base station, an external terminal, or a server on a mobile communication network.

According to an embodiment of the disclosure, the communication module 1810 is connected to an AP in the house through Wi-Fi communication. The network module 1810 may communicate with an external device through the AP.

The input interface 1820 receives a user input. The user interface 1820 may include a key, a touch panel, a touch screen, a dial, a button, and the like.

Figure 19:
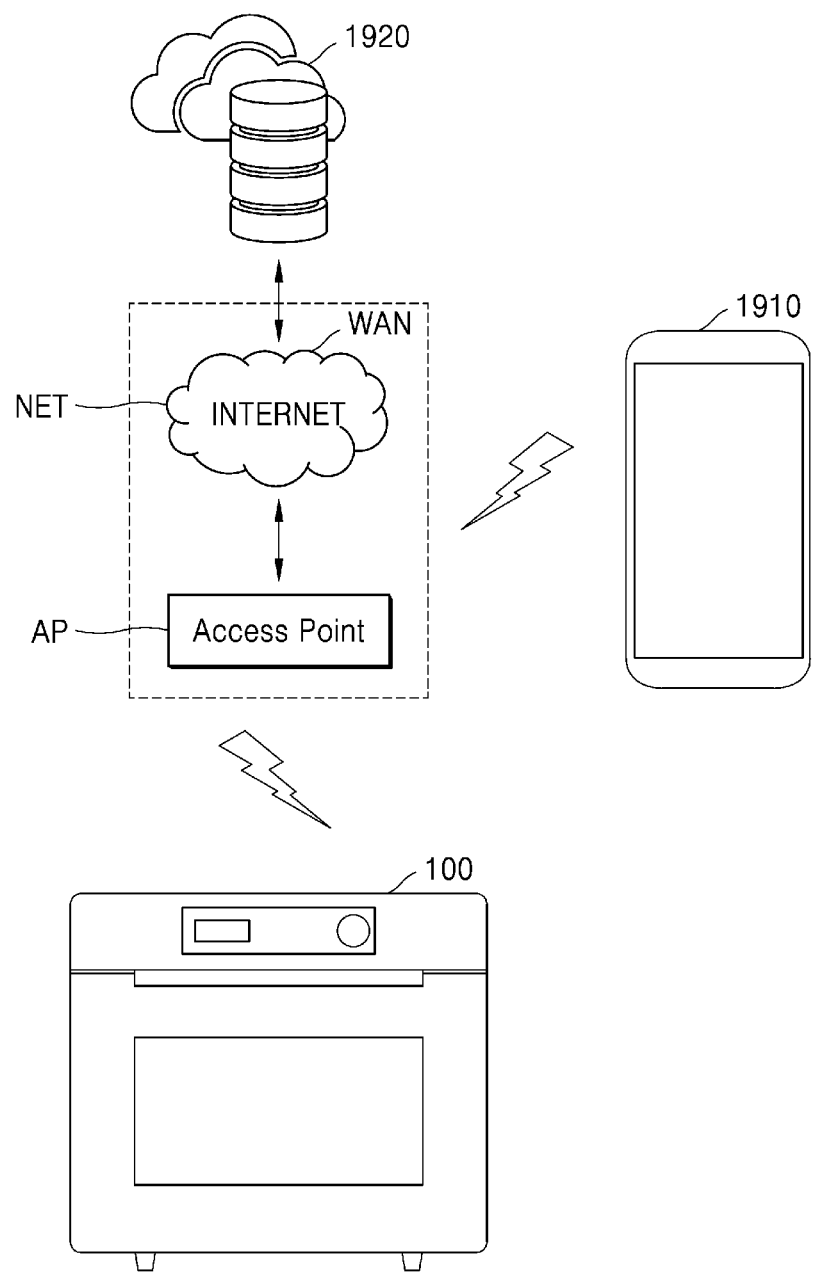
FIG. 19 illustrates a cooking apparatus, a user apparatus, and a server, according to an embodiment of the disclosure.

FIG. 19 illustrates a cooking apparatus, a user apparatus, and a server, according to an embodiment of the disclosure.

According to an embodiment of the disclosure, the cooking apparatus 100 communicates with a user apparatus 1910 and a server 1920 through the communication module 1810. The cooking apparatus 100 may be connected to another home appliance, the user apparatus 1910, or the server 1920 through a network NET.

The server 1920 may manage user account information and information of the cooking apparatus 100 connected to a user account. For example, a user may access the server 1920 through the user apparatus 1910 and create the user account. The user account may be identified by an ID and a password both set by the user. The server 1920 may register the cooking apparatus 100 in the user account according to a predetermined procedure. For example, the server 1920 may register the cooking apparatus 100 by connecting identification information (e.g., a serial number or a MAC address) of the cooking apparatus 100 to the user account.

The user apparatus 1910 may include a communication module configured to communicate with the cooking apparatus 100 and the server 1920, a user interface for receiving a user input or outputting information to the user, at least one processor for controlling an operation of the user apparatus 1910, and a memory storing a program for controlling the operation of the user apparatus 1910.

In one or more examples, the user apparatus 1910 may be carried by the user or placed in the user's house or office. The user apparatus 1910 may include, for example, a personal computer, a terminal, a portable telephone, a smartphone, a handheld device, a wearable device, and the like, but embodiments of the disclosure are not limited thereto.

In one or more examples, a program (e.g., an application) for controlling the cooking apparatus 100 may be stored in the memory of the user apparatus 1910. The user apparatus 1910 may be sold with an application for controlling the cooking apparatus 100 installed or not installed therein. When the user apparatus 1910 is sold without an application for controlling the cooking apparatus 100, the user may download the application from an external server that provides the application, and install the downloaded application on the user apparatus 1910.

In one or more examples, the user may control the cooking apparatus 100 by using the application installed on the user apparatus 100. For example, when the user executes the application installed on the user apparatus 1910, identification information of the cooking apparatus 100 connected to the same user account as the user apparatus 1910 may appear on an application execution window. The user may perform desired control on the cooking apparatus 100 through the application execution window. When the user inputs a control command for the cooking apparatus 100 through the application execution window, the user apparatus 1910 may directly transmit the control command to the cooking apparatus 100 through a network or may transmit the control command to the cooking apparatus 100 via the server 1920.

The network NET may include both a wired network and a wireless network. The wired network may include a cable network or a telephone network, and the wireless network may include any network that transmits and receives signals through radio waves. The wired network and the wireless network may be connected to each other.

The network NET may include a wide area network (WAN) such as the Internet, a local area network (LAN) formed around an AP, and a wireless personal area network (WPAN) not going through an AP. The WPAN may include, but is not limited to, Bluetooth™ (IEEE 802.15.1), Zigbee (IEEE 802.15.4), Wi-Fi Direct, Near Field Communication (NFC), and Z-Wave.

The AP may connect a LAN to which the cooking apparatus 100 and the user apparatus 1910 are connected to a WAN to which the server 1920 is connected. The cooking apparatus 100 or the user apparatus 1910 may be connected to the server 1930 through the WAN.

The AP may communicate with the cooking apparatus 100 and the user apparatus 1910 by using wireless communication such as Wi-Fi™ (IEEE 802.11), and may access a WAN via wired communication.

The cooking apparatus 100 may transmit information about an operation or a state to the server 1920 through the network NET. For example, the cooking apparatus 100 may transmit the information about an operation or a state to the server 1920 via Wi-Fi™ (IEEE 802.11). When the cooking apparatus 100 does not have a Wi-Fi communication module, the cooking apparatus 100 may transmit the information about an operation or a state to the server 1920 through another home appliance having a Wi-Fi communication module. For example, when the cooking apparatus 100 transmits information about an operation or state to another home appliance through a WPAN (e.g., Bluetooth Low Energy (BLE) communication), the other home appliance may transmit information about an operation or state of the cooking apparatus 100 to the server 1920. The cooking apparatus 100 may provide the information about the operation or state of the cooking apparatus 100 to the server 1920 according to the user's previous approval. The information transmission to the server 1920 may be performed when a request is received from the server 1920, may be performed when a specific event occurs in the cooking apparatus 100, or may be performed periodically or in real time.

When the operation or state information is received from the cooking apparatus 100, the server 1920 may update previously-stored information related to the cooking apparatus 100. The server 1920 may transmit the information about the operation or state of the cooking apparatus 100 to the user apparatus 1910 through the network NET. When receiving a request from the user apparatus 1910, the server 1920 may transmit the information about the operation or state of the cooking apparatus 100 to the user apparatus 1910. For example, when the user executes an application connected from the user apparatus 1910 to the server 1920, the user apparatus 1910 may request the server 1920 for the information about the operation or state of the cooking apparatus 100 and receive the information about the operation or state of the cooking apparatus 100. When the operation or state information of the cooking apparatus 100 has been received from the cooking apparatus 100, the server 1920 may transmit the information about the operation or state of the cooking apparatus 100 to the user apparatus 1910 in real time. For example, when the server 1920 has received, from the cooking device 100, information indicating that the operation of the cooking apparatus 100 has been completed, the server 1920 may transmit, in real time, the information indicating that the operation of the cooking apparatus 100 has been completed to the user apparatus 1910 through the application installed in the user apparatus 1910. The server 1920 may periodically transmit the information about the operation or state of the cooking apparatus 100 to the user apparatus 1910. The user apparatus 1910 may transmit the information about the operation or state of the cooking apparatus 100 to the user by displaying the information about the operation or state of the cooking apparatus 100 on the application execution window.

The cooking apparatus 100 may obtain various pieces of information from the server 1920 and provide the obtained information to the user. For example, the cooking apparatus 100 may obtain information, such as recipes and the weather, from the server 1920, and output the obtained information through the output interface 250. The cooking apparatus 100 may receive a file for updating pre-installed software or data related to the pre-installed software from the server 1920, and update the pre-installed software or the data related to the pre-installed software, based on the received file.

The cooking apparatus 100 may operate according to the control command received from the server 1920. For example, when the cooking apparatus 100 obtains a prior approval from a user configured to act according to a control command from the server 1920 even without a user input, the cooking apparatus 100 may operate according to the control command received from the server 1920. The control command received from the server 1920 may include, but is limited to, a control command input by the user through the user apparatus 1920 or a control command created based on preset conditions by the server 1920.

Figure 20:
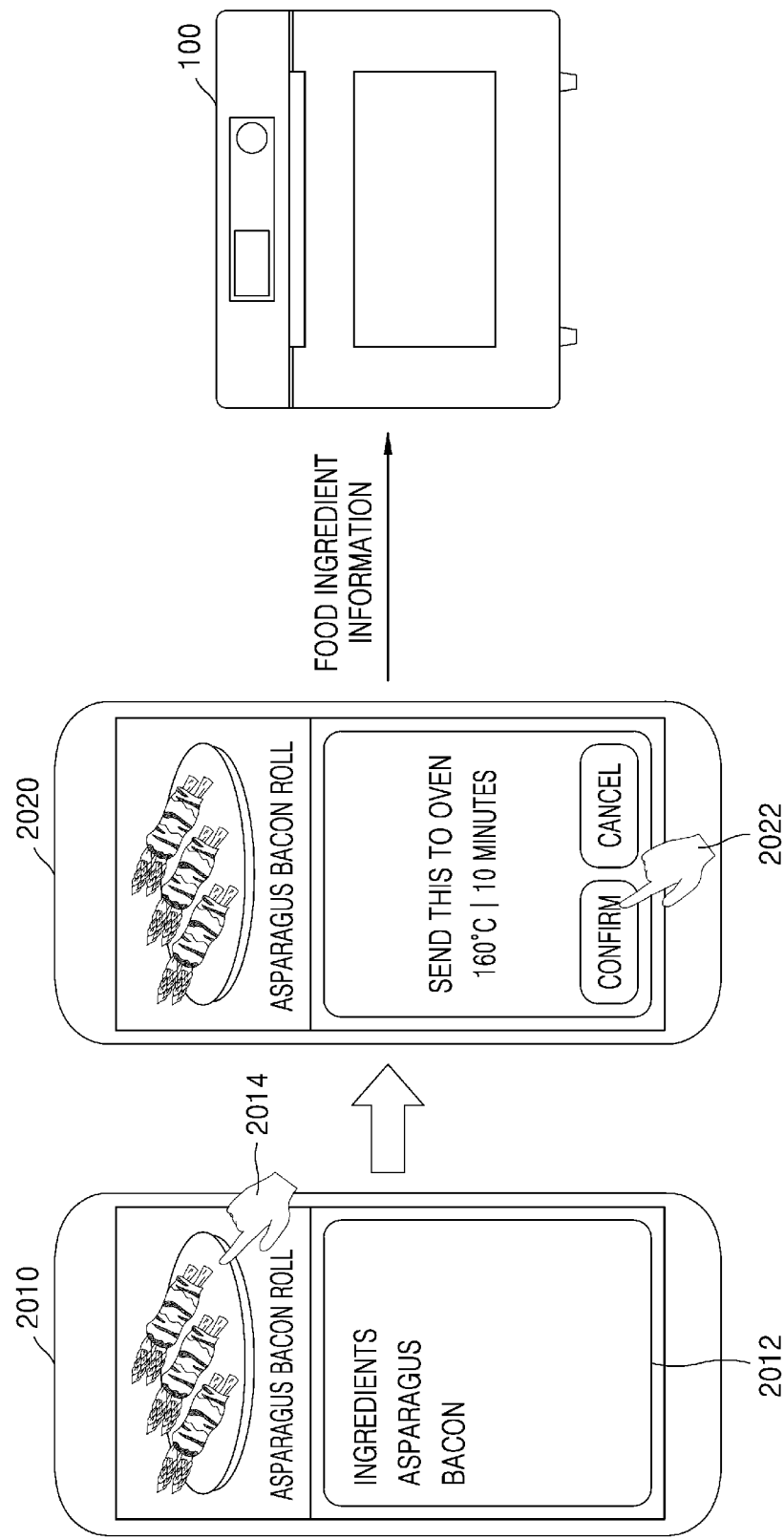
FIG. 20 is a view illustrating a process of obtaining food ingredient information from a user apparatus, according to an embodiment of the disclosure.

FIG. 20 is a view illustrating a process of obtaining food ingredient information from a user apparatus, according to an embodiment of the disclosure.

According to an embodiment of the disclosure, the user apparatus 1910 may store and execute a first application for controlling the cooking apparatus 100. The first application performs various operations, such as control of the cooking apparatus 100, provision of recipe information, and inputting of food ingredient information. The user apparatus 1910 may receive food ingredient information through the first application and transmit the food ingredient information to the cooking apparatus 100.

The first application may operate in conjunction with the server 1920 while being executed in the user apparatus 1910. For example, the first application may perform information input and output operations, a data processing operations, etc. through the user apparatus 1910, and may perform communication with the cooking apparatus 100, an information search operation, etc. through the server 1920. Accordingly, an operation performed by the first application in the disclosure may be performed by the user apparatus 1910 or the server 1920.

According to an embodiment of the disclosure, in operation 2010, the user apparatus 1910 may provide recipe information through the first application. The recipe information may include food ingredient information 2012 of a recipe. When the user selects a recipe (operation 2014), the first application inquires whether to proceed with cooking in the cooking apparatus 100 by using the recipe, in operation 2020. When the user selects (operation 2022) that the cooking apparatus 100 cooks with the recipe through the first application, the user apparatus 1910 may transmit the food ingredient information 2012 included in the recipe to the cooking apparatus 100. The user apparatus 1910 may transmit the food ingredient information to the cooking apparatus 100 via the server 1920.

According to an embodiment of the disclosure, the user apparatus 1910 may transmit recipe information selected by the user to the cooking apparatus 100. According to an embodiment of the disclosure, the first application may transmit, to the cooking apparatus 100, a control signal for controlling an operation of the cooking apparatus 100 according to the recipe information selected by the user. The cooking apparatus 100 may set a cooking operation, based on the recipe information received from the first application. For example, the cooking apparatus 100 may perform operations, such as temperature setting, cooking time setting, blowing, and steaming, based on the recipe information.

According to an embodiment of the disclosure, the user apparatus 1910 may directly receive the food ingredient information from the user through the first application. The first application may provide a menu in which the user directly specifies food ingredients without selecting recipe information. When the user directly designates and inputs food ingredients, the first application transmits information about the food ingredients input by the user to the cooking apparatus 100.

Figure 21:
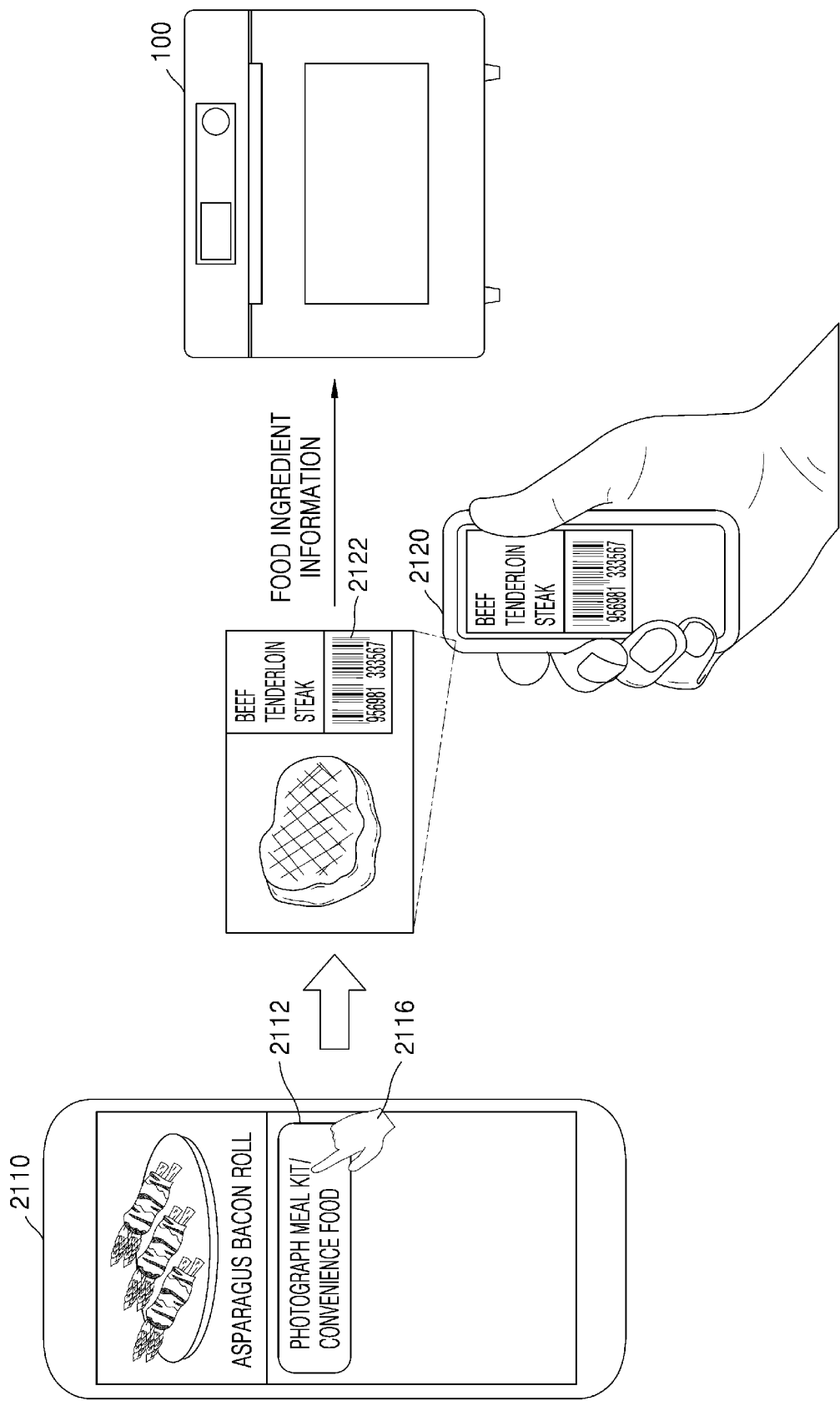
FIG. 21 is a view illustrating a process of obtaining food ingredient information from a user apparatus, according to an embodiment of the disclosure.

FIG. 21 is a view illustrating a process of obtaining food ingredient information from a user apparatus, according to an embodiment of the disclosure.

According to an embodiment of the disclosure, the first application of the user apparatus 1910 may photograph information related to food ingredients by using a camera, and obtain food ingredient information from a captured image. According to an embodiment of the disclosure, the first application may obtain food ingredient information by using a visual code such as a barcode or a QR code.

In operation 2110, the first application may provide a visual code photographing menu 2112 for obtaining meal kit or convenience food information by using a visual code. When the user selects the visual code photographing menu 2112 (operation 2116), the first application may execute a photographing mode configured to photograph a visual code 2122 by using a camera, in operation 2120. The first application may recognize a visual code from a captured image captured by a camera. The first application may obtain meal kit/convenience food information corresponding to the recognized visual code. The meal kit/convenience food information may include recipes, ingredient information, or any other suitable information pertaining to the food or cooking process.

According to an embodiment of the disclosure, the first application may request the server 1920 for meal kit/convenience food information corresponding to the visual code, and may receive the meal kit/convenience food information corresponding to the visual code from the server 1920. According to an embodiment of the disclosure, the first application stores meal kit/convenience food information corresponding to the visual code in the memory of the user apparatus 1910. The first application obtains meal kit/convenience food information corresponding to the visual code by using the meal kit/convenience meal information stored in the user apparatus 1910.

The first application may transmit the meal kit/convenience food information to the cooking apparatus 100. When the user requests to transmit the meal kit/convenience food information to the cooking apparatus 100, the first application may transmit the meal kit/convenience food information to the cooking apparatus 100. The first application may transmit the recipes, the ingredient information, and the like included in the meal kit/convenience food information to the cooking apparatus 100.

While transmitting the meal kit/convenience food information to the cooking apparatus 100, the first application may transmit, to the cooking apparatus 100, a control signal for controlling the operation of the cooking apparatus 100 according to the meal kit/convenience meal information. The cooking apparatus 100 may set a cooking operation, based on recipe information included in the meal kit/convenience food information received from the user apparatus 1910. For example, the cooking apparatus 100 may perform operations, such as temperature setting, cooking time setting, blowing, and steaming, based on the recipe information included in the meal kit/convenience food information.

Figure 22:
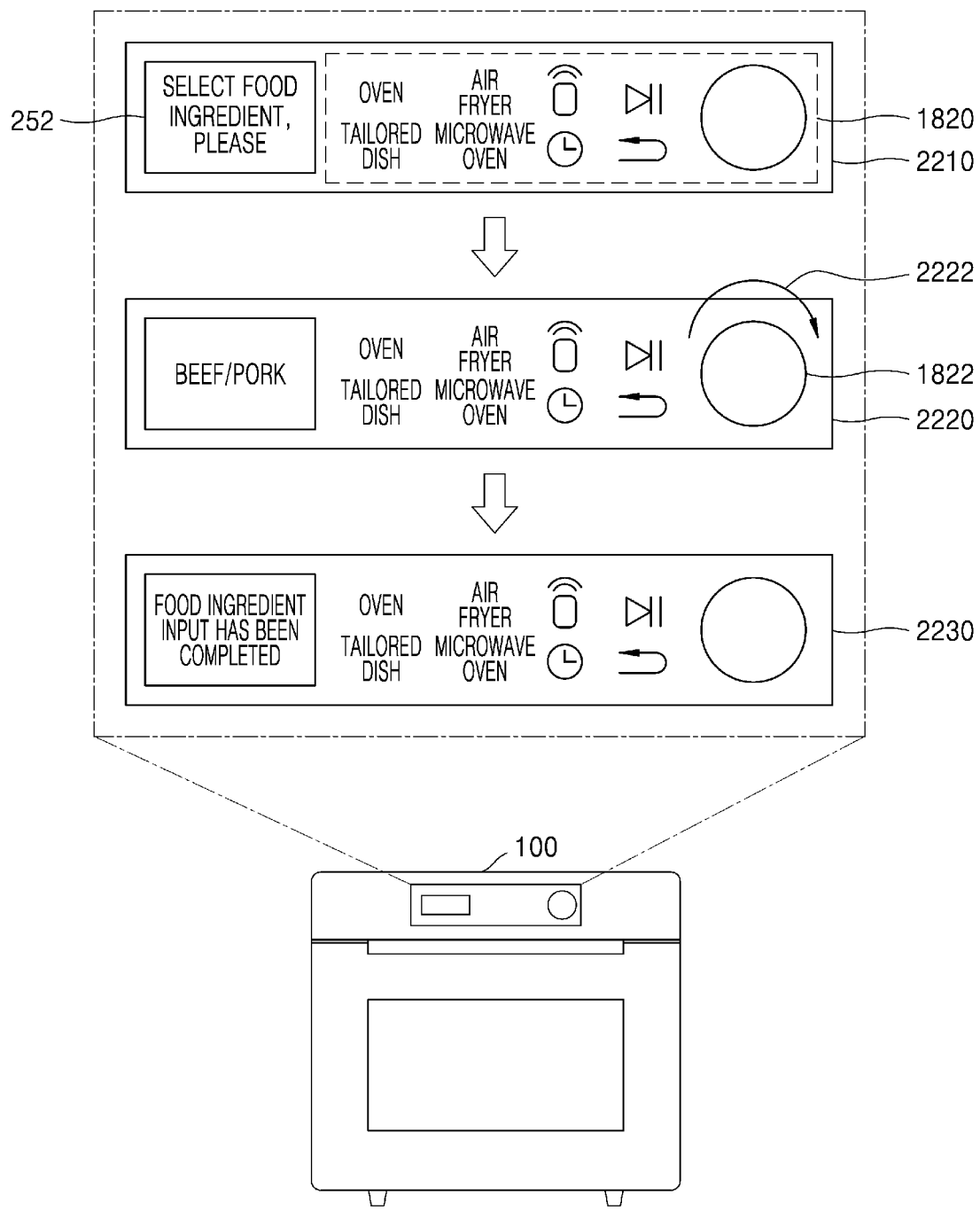
FIG. 22 is a view illustrating a process of receiving food ingredient information through an input interface of a cooking apparatus, according to an embodiment of the disclosure.

FIG. 22 is a view illustrating a process of receiving food ingredient information through an input interface of a cooking apparatus, according to an embodiment of the disclosure.

According to an embodiment of the disclosure, the cooking apparatus 100 may obtain the food ingredient information through the input interface 1820 of the cooking apparatus 100.

In operation 2210, the cooking apparatus 100 may provide a menu for inputting food ingredient information, before starting a cooking operation. A display 252 of the output interface 250 may output a message that commands selection of food ingredients.

In operation S2220, the cooking apparatus 100 may receive a user input of selecting food ingredients. According to an embodiment of the disclosure, the input interface 1820 may include a dial 1822, and the user may select one of a plurality of candidate ingredients by rotating the dial 1822 (operation 2222). The display 252 of the output interface 250 outputs information about currently-selected food ingredients.

In operation S2230, the cooking apparatus 100 may complete food ingredient inputs, and obtains food ingredient information. The cooking apparatus 100 may set a monitoring region, based on the food ingredient information obtained from a user input. The display 252 of the output interface 250 may output a message indicating that selection of food ingredients has completed.

FIG. 23 illustrates a process of setting a monitoring region, based on color data of a captured image, according to an embodiment of the disclosure.

According to an embodiment of the disclosure, the cooking apparatus 100 may determine the monitoring region based on the color data of the captured image without recognizing food ingredients.

The cooking apparatus 100 may identify color data of each pixel from a captured image 2310. In FIG. 23, for convenience of description, a case where color data of three regions are uniform in a captured image is described. However, as understood by one of ordinary skill in the art, any number of regions may be utilized. According to an embodiment of the disclosure, the cooking apparatus 100 may identify the color data of each pixel and determine a similarity to the fire-related color. According to an embodiment of the disclosure, the cooking apparatus 100 may identify the color data of each region including a plurality of pixels, and determine a similarity to the fire-related color. For example, the cooking apparatus 100 may identify color data in units of 3*3 blocks and determine a similarity to the fire-related color.

An embodiment of the disclosure in which the cooking apparatus 100 identifies the color data of each pixel and determines a similarity to the fire-related color will be mainly described for convenience of description. However, this is merely for convenience of description, and the disclosure does not exclude an embodiment of identifying the color data of each region including a plurality of pixels and determines a similarity to the fire-related color.

The cooking apparatus 100 may determine the similarity to the fire-related color, for the color data of each pixel. The cooking apparatus 100 may calculate a similarity to the flame-related color and a similarity to the smoke-related color, for the color data of each pixel. The example of FIG. 23 corresponds to a case where a food ingredient is raw poultry (e.g., chicken). In the example of FIG. 23, a first region 2312 of the raw chicken is a region corresponding to a skin color, where it is determined that a similarity to the flame-related color is low, and a similarity to the smoke-related color is high. A second region 2314 of the raw chicken is a region corresponding to a red color, where it is determined that a similarity to the flame-related color is high and a similarity to the smoke-related color is low. A third region 2316 is a black region corresponding to the tray of the cooking apparatus 100, where it is determined that a similarity to the flame-related color is low and a similarity to the smoke-related color is low.

The cooking apparatus 100 may select the monitoring region based on the similarity to the flame-related color and the similarity to the smoke-related color. The cooking apparatus 100 may set, as the monitoring region, a pixel in which the similarity to the flame-related color is low and the similarity to the smoke-related color is high. The cooking apparatus 100 may set, as the monitoring region, a pixel in which the similarity to the flame-related color is high and the similarity to the smoke-related color is low. The cooking apparatus 100 may set, as a flame monitoring region and a smoke monitoring region, a pixel in which the similarity to the flame-related color is low and the similarity to the smoke-related color is low.

The cooking apparatus 100 may select, as the flame monitoring region, a portion or the entirety of a region selected as the flame monitoring region.

According to an embodiment of the disclosure, when the cooking apparatus 100 selects a portion among the flame monitoring region, the cooking apparatus 100 may select the flame monitoring region at predetermined intervals within pixels selected as the flame monitoring region.

According to an embodiment of the disclosure, when the pixels selected as the flame monitoring area have a plurality of colors, the cooking apparatus 100 may select the flame monitoring region to include pixels of different colors. The cooking apparatus 100 may divide the pixels of the flame monitoring region into a plurality of color groups, and select at least one flame monitoring region for each of the plurality of color groups.

The cooking apparatus 100 may select, as the smoke monitoring region, a portion or the entirety of a region selected as the smoke monitoring region.

According to an embodiment of the disclosure, when the cooking apparatus 100 selects a portion among the smoke monitoring region, the cooking apparatus 100 may select the smoke monitoring region at predetermined intervals within pixels selected as the smoke monitoring region.

According to an embodiment of the disclosure, when the pixels selected as the smoke monitoring area have a plurality of colors, the cooking apparatus 100 may select the smoke monitoring region to include pixels of different colors. The cooking apparatus 100 may divide the pixels of the smoke monitoring region into a plurality of color groups, and select at least one smoke monitoring region for each of the plurality of color groups.

Figure 24:
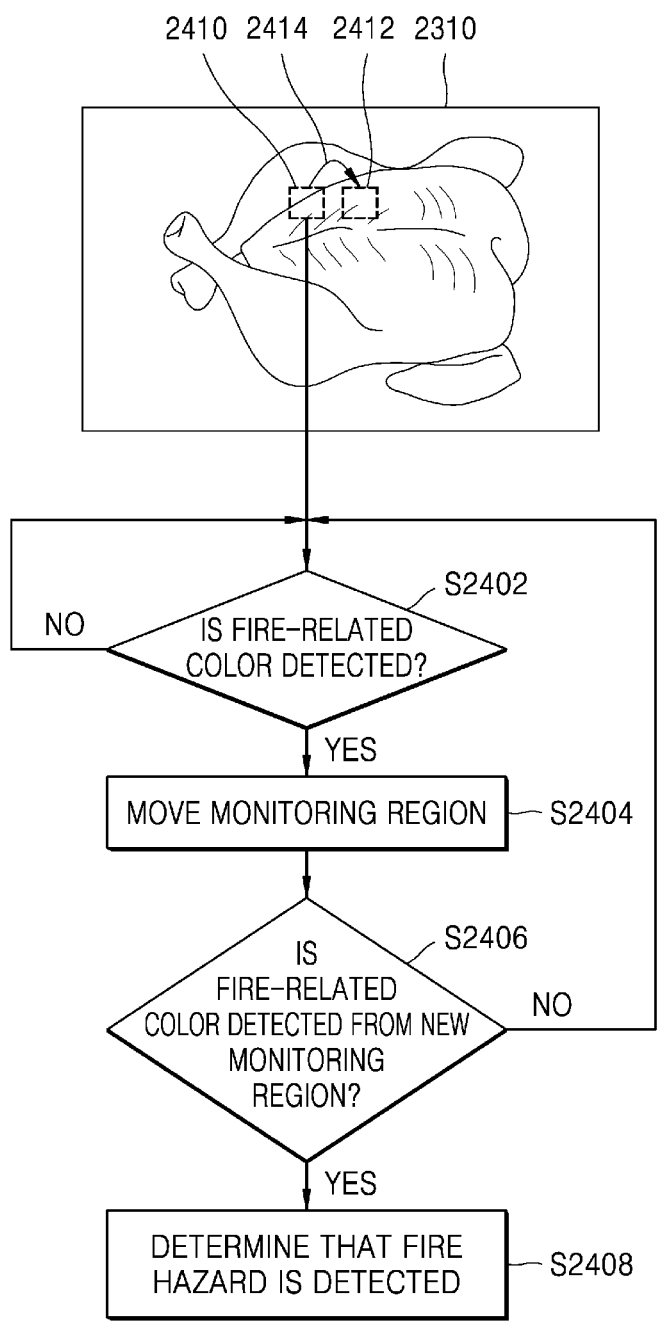
FIG. 24 is a flowchart of a process of detecting a fire hazard, according to an embodiment of the disclosure.

FIG. 24 is a flowchart of a process of detecting a fire hazard, according to an embodiment of the disclosure.

According to an embodiment of the disclosure, when the cooking apparatus 100 selects a monitoring region based on color data of a captured image 2310 without obtaining food ingredient information, the cooking apparatus 100 may move the monitoring region during a process of detecting a fire hazard. When the cooking apparatus 100 does not obtain food ingredient information, the cooking apparatus 100 does not have information about how color data of a food ingredient changes during cooking. When the cooking apparatus 100 does not obtain food ingredient information, the cooking apparatus 100 may predict a shape change, shrinkage, expansion, or any other known change of the food ingredient during cooking. According to an embodiment of the disclosure, when the cooking apparatus 100 does not obtain food ingredient information and the fire-related color is detected from the monitoring region, the cooking apparatus 100 moves the monitoring region and monitors the fire-related color once again.

A case in which a monitoring region 2410 is set in a captured image will be described with reference to FIG. 24.

In operation S2402, the cooking apparatus 100 determines whether a pixel having a high similarity to the fire-related color exists in the monitoring region 2410. The cooking apparatus 100 determines whether a similarity between the color data of each pixel in the monitoring region 2410 and the flame-related color or the smoke-related color is greater than or equal to a reference value.

When it is determined in operation S2402 that a similarity between color data of the monitoring region 2410 and the fire-related color is less than the reference value, the cooking apparatus 100 may perform operation S2402 by using a next captured image.

When a color having a high similarity to the fire-related color is detected in operation S2402, the cooking apparatus 100 moves the monitoring region, in operation S2404. When moving the monitoring region, the cooking apparatus 100 selects a new monitoring region by selecting a pixel having a color that has a low similarity to the fire-related color. In the example of FIG. 24, the cooking apparatus 100 changes the monitoring region from the existing monitoring region 2410 to a new monitoring region 2412 (operation 2414).

When the existing monitoring region 2410 is a flame monitoring region, the cooking apparatus 100 selects a region having a low color similarity with the flame-related color as the new monitoring region 2412. When the existing monitoring region 2410 is a smoke monitoring region, the cooking apparatus 100 selects a region having a low color similarity with the smoke-related color as the new monitoring region 2412.

In operation S2406, the cooking apparatus 100 determines whether a similarity of color data of the new monitoring region 2412 to the fire-related color is equal to or greater than a reference value. When the similarity of the color data of the new monitoring region 2412 to the fire-related color is changed to be equal to or greater than the reference value, the cooking apparatus 100 determines that a fire hazard has been detected, in operation S2408.

When it is determined in operation S2406 that the similarity of the color data of the new monitoring region 2412 to the fire-related color is less than the reference value, the cooking apparatus 100 performs operation S2406 by using a next captured image.

Figure 25:
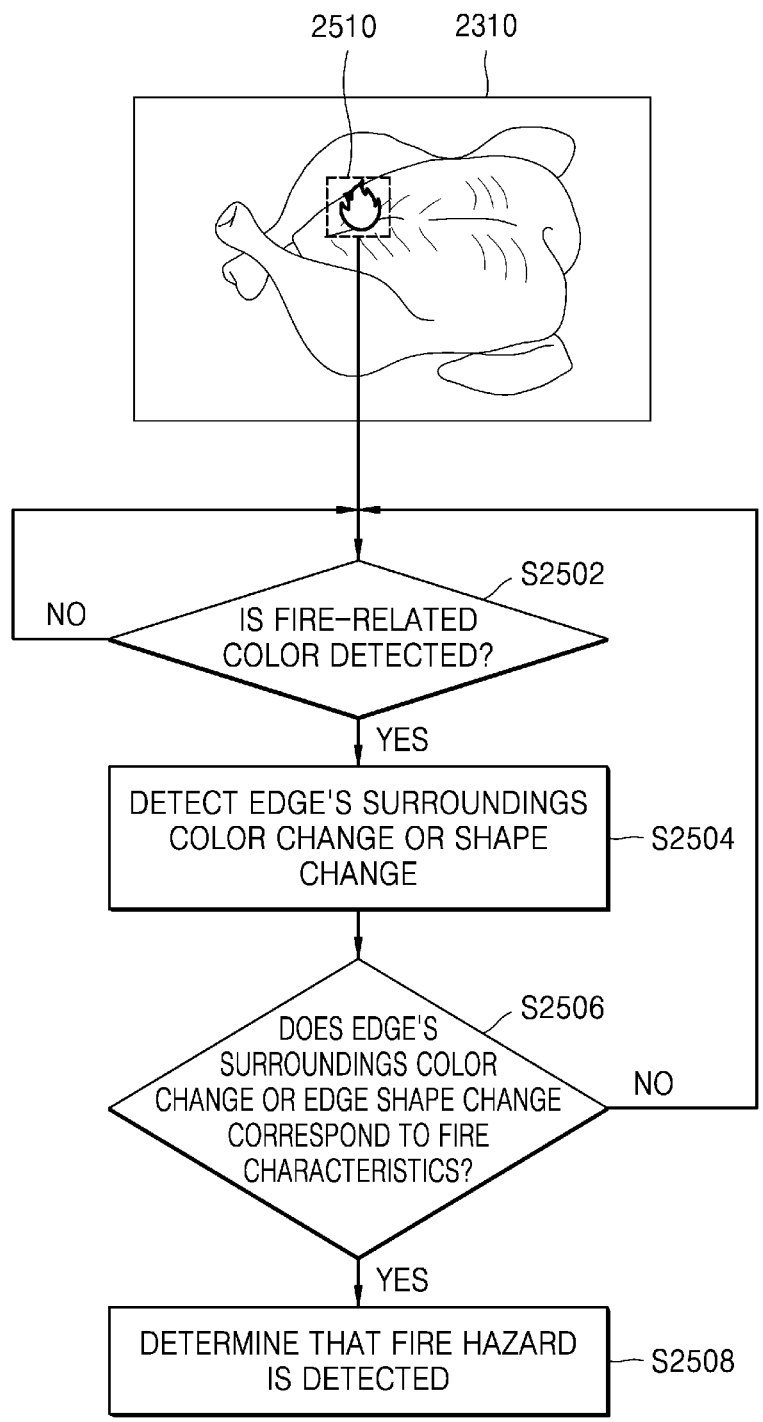
FIG. 25 is an example of a case where a flame is detected in a monitoring region, according to an embodiment of the disclosure.

FIG. 25 is a flowchart of a process of detecting a fire hazard, based on a change in a color around an edge and a change in the shape of the edge, according to an embodiment of the disclosure.

According to an embodiment of the disclosure, when the fire-related color is detected based on the color data of the captured image 2310, the cooking apparatus 100 detects a fire hazard by determining whether a change in a color around an edge and a change in the shape of the edge correspond to fire characteristics, based on the characteristics of flame or smoke.

FIG. 25 is an example of a case where a flame is detected in a monitoring region 2510.

In operation S2502, the cooking apparatus 100 determines whether a pixel having a high similarity to the fire-related color exists in the monitoring region 2510. The cooking apparatus 100 determines whether a similarity of the color data of each pixel in the monitoring region 2510 to the flame-related color or the smoke-related color is greater than or equal to a reference value.

When it is determined in operation S2502 that the similarity of color data of the monitoring region 2510 to the fire-related color is less than the reference value, the cooking apparatus 100 may perform operation S2502 by using a next captured image.

When it is determined in operation S2502 that the similarity of the color data of the monitoring region 2510 to the fire-related color is equal to or greater than the reference value, the cooking apparatus 100 detects an edge's surroundings color change or an edge shape change, in operation S2504.

For example, when the monitoring region 2510 having a color similarity with the flame-related color equal to or greater than a reference value is detected from the monitoring region 2510, the cooking apparatus 100 monitors a change in the shape of a region having a color having a high similarity with the flame-related color.

For example, when the monitoring region 2510 having a color similarity with the smoke-related color equal to or greater than a reference value is detected from the monitoring region 2510, the cooking apparatus 100 monitors a change in the color around an edge of a food ingredient.

In operation S2506, the cooking apparatus 100 determines whether the edge's surroundings color change or the edge shape change corresponds to the fire characteristics.

For example, the cooking apparatus 100 determines whether the change in the shape of the region having a color having a high similarity with the flame-related color in the monitoring region 2510 corresponds to flame. When the shape change corresponds to flame, the cooking apparatus 100 determines that the edge shape change in the monitoring region 2510 corresponds to the fire characteristics.

For example, when the color similarity of the monitoring region 2510 to the smoke-related color is equal to or greater than the reference value, the cooking apparatus 100 determines whether the color around the edge of the food ingredient has been uniformly changed. When the color around the edge of the food ingredient has been uniformly changed, the cooking apparatus 100 determines that the change in the color around the edge corresponds to the fire characteristics.

When it is determined in operation S2506 that the change in the color around the edge corresponds to the fire characteristics, the cooking apparatus 100 determines that a fire hazard has been detected, in operation S2508. When it is determined in operation S2506 that the change in the color around the edge does not correspond to the fire characteristics, the cooking apparatus 100 performs operation S2502 by using a next captured image.

Embodiments of outputting a fire hazard notification will now be described with reference to FIGS. 26 through 29.

Figure 26:
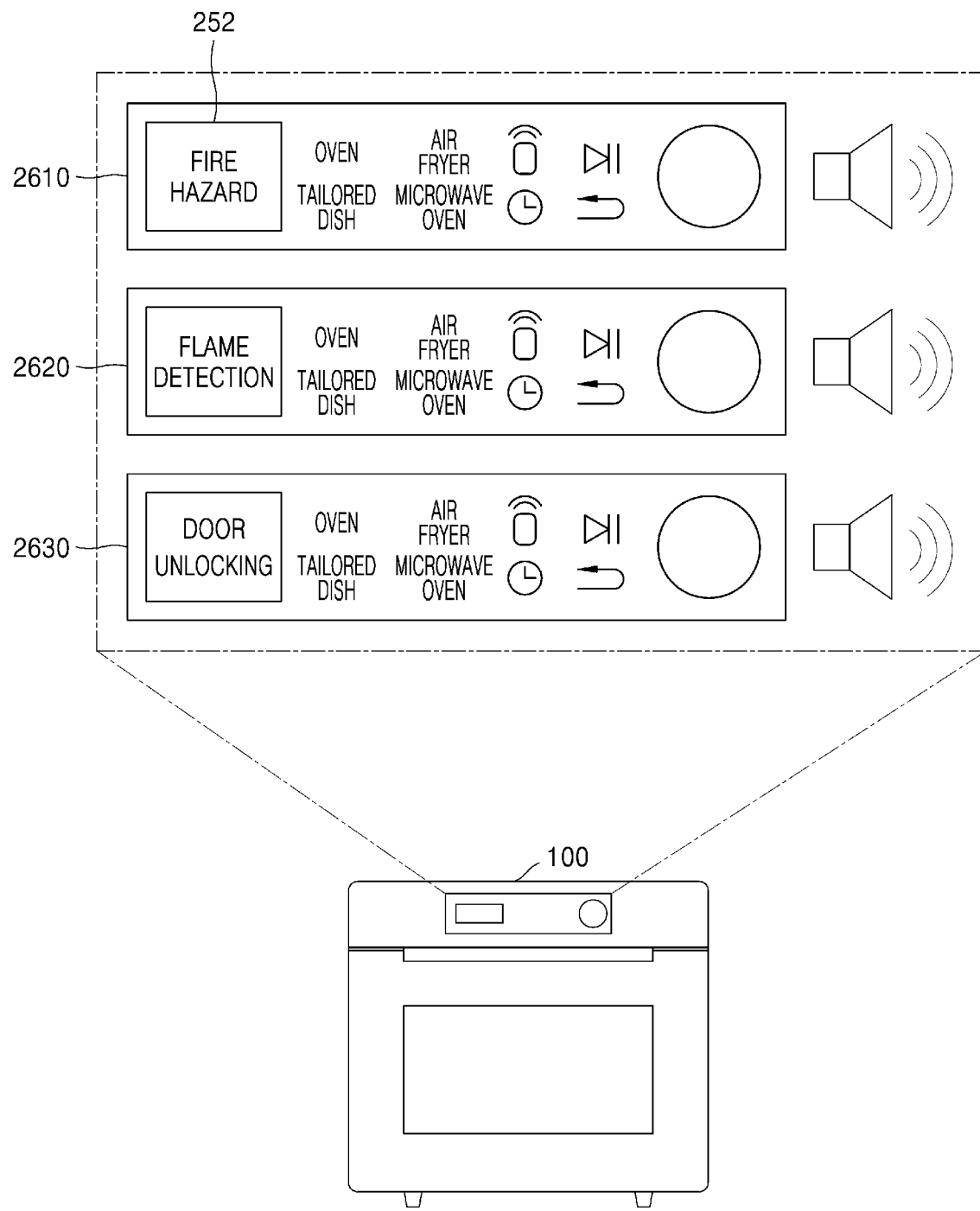
FIG. 26 is a view illustrating a process of outputting a fire hazard, according to an embodiment of the disclosure.

FIG. 26 is a view illustrating a process of outputting a fire hazard, according to an embodiment of the disclosure.

According to an embodiment of the disclosure, when the cooking apparatus 100 detects a fire hazard, the cooking apparatus 100 may output the fire hazard through the output interface 250. For example, the cooking apparatus 100 may display a fire hazard message through a display. For example, the cooking apparatus 100 may output the fire hazard message as an audio signal through a speaker.

According to an embodiment of the disclosure, a fire hazard notification may include at least one of information indicating that a fire hazard has been detected, the type of fire hazard, response guide information, or cooking apparatus operation change information. The type of fire hazard may include information such as smoke detection, flame detection, or temperature spike. The response guide information may include, for example, a request to open a door, a request to cut off power, or a request to prohibit contact. The cooking apparatus operation change information may include information such as door unlocking, cooking operation interruption, automatic power cutoff, or steam discharge from the cooking chamber.

In operation 2610, the cooking apparatus 100 may output information indicating that a fire hazard has occurred. For example, the cooking apparatus 100 may display a message indicating that a fire hazard has occurred, through the display 252 of the output interface 250. The cooking apparatus 100 may output a fire hazard warning sound or a fire hazard voice message through a speaker of the output interface 250.

In operation 2620, the cooking apparatus 100 may output the type of fire hazard. For example, the cooking apparatus 100 may display a message indicating that flame has been detected or a message indicating that smoke has been detected, through the display 252 of the output interface 250. The cooking apparatus 100 may output a voice message indicating that flame has been detected or a voice message indicating that smoke has been detected, through the speaker of the output interface 250.

In operation 2630, the cooking apparatus 100 may output cooking apparatus operation change information for the fire hazard. For example, the cooking apparatus 100 may display a message indicating that a door has been unlocked, a message indicating that cooking is stopped, and a message indicating that power is cut off, through the display 252 of the output interface 250. The cooking apparatus 100 may output a voice message indicating that a door has been unlocked, a voice message indicating that cooking is stopped, and a voice message indicating that power is cut off, through the speaker of the output interface 250.

The order of operations 2610, 2620, and 2630 may be performed sequentially or non-sequentially. The cooking apparatus 100 may perform at least one of operations 2610, 2620, and 2630, or a combination thereof.

Figure 27:
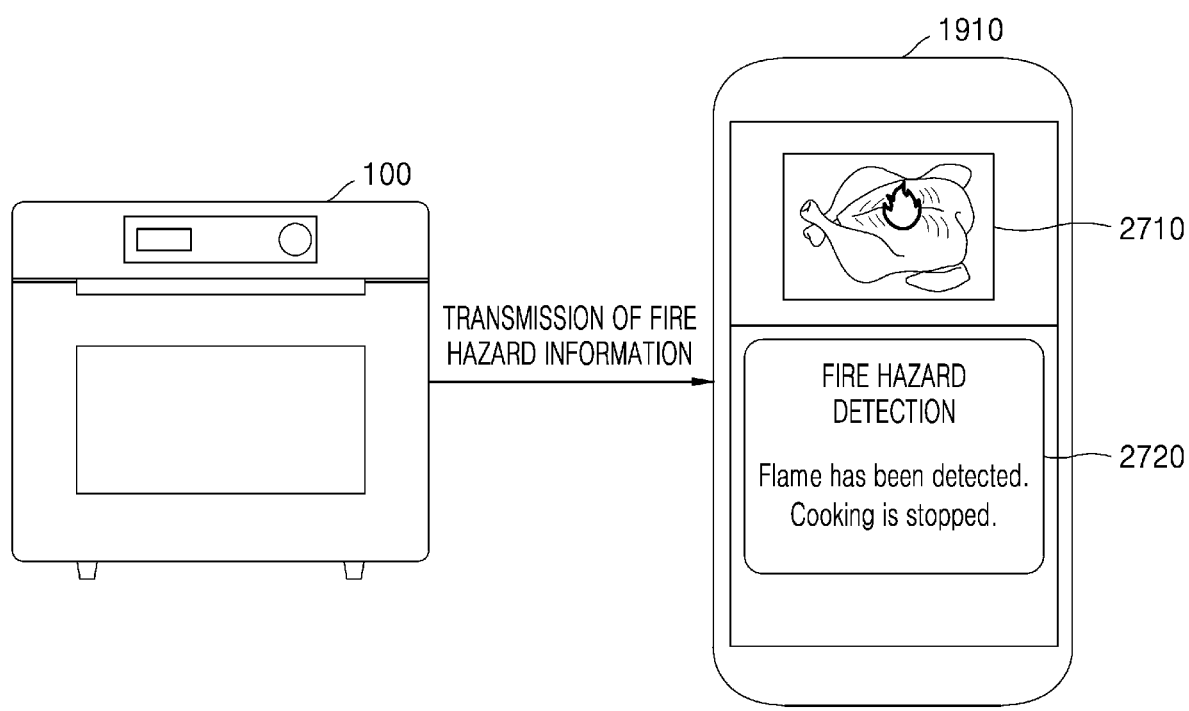
FIG. 27 is a view illustrating a process of outputting a fire hazard through a user apparatus, according to an embodiment of the disclosure.

FIG. 27 is a view illustrating a process of outputting a fire hazard through a user apparatus, according to an embodiment of the disclosure.

According to an embodiment of the disclosure, when a fire hazard is detected, the cooking apparatus 100 may output fire hazard information through an external device of the user apparatus 1910 or any other suitable device. When a fire hazard is detected, the cooking apparatus 100 may determine that a fire hazard event has occurred. When a fire hazard event has occurred, the cooking apparatus 100 may generate the fire hazard information. The fire hazard information may include at least one of information indicating that a fire hazard has been detected, the type of fire hazard, response guide information, or cooking apparatus operation change information. The cooking apparatus 100 may transmit the fire hazard information to the user apparatus 1910. The cooking apparatus 100 may also transmit an output request of the fire hazard notification, account information in which the cooking apparatus 100 is registered, identification information (e.g., an MAC address) of the cooking apparatus 100, and the like, together with the fire hazard information, to the user apparatus 1910.

As described above with reference to FIG. 19, the cooking apparatus 100 may communicate with the user apparatus 1910 through the server 1920. The cooking apparatus 100 may transmit the fire hazard information to the server 1920 through the communication module 1810. The server 1920 transmits the fire hazard information to the user apparatus 1910 registered in the same account as the cooking apparatus 100.

The user apparatus 1910 may receive and output the fire hazard information. The user apparatus 1910 may display fire hazard information 2720 through the first application. When the first application is not running, the user apparatus 1910 may display the fire hazard information 2720 through a pop-up message provided by the first application. The user apparatus 1910 may output vibration or sound while displaying the fire hazard information 2720.

According to an embodiment of the disclosure, the first application may display a real-time captured image obtained by photographing the interior of the cooking chamber 230, together with the fire hazard information 2720. The cooking apparatus 100 may transmit the real-time captured image to the server 1920, and the server 1920 may stream the real-time captured image to the cooking apparatus 100.

According to an embodiment of the disclosure, the first application may display a captured image 2710 in which a fire hazard is detected. The first application may obtain a still image or moving picture in which a fire hazard is detected from a captured image. The first application may display the still image or moving picture in which a fire hazard is detected, together with the fire hazard information 2720.

Figure 28:
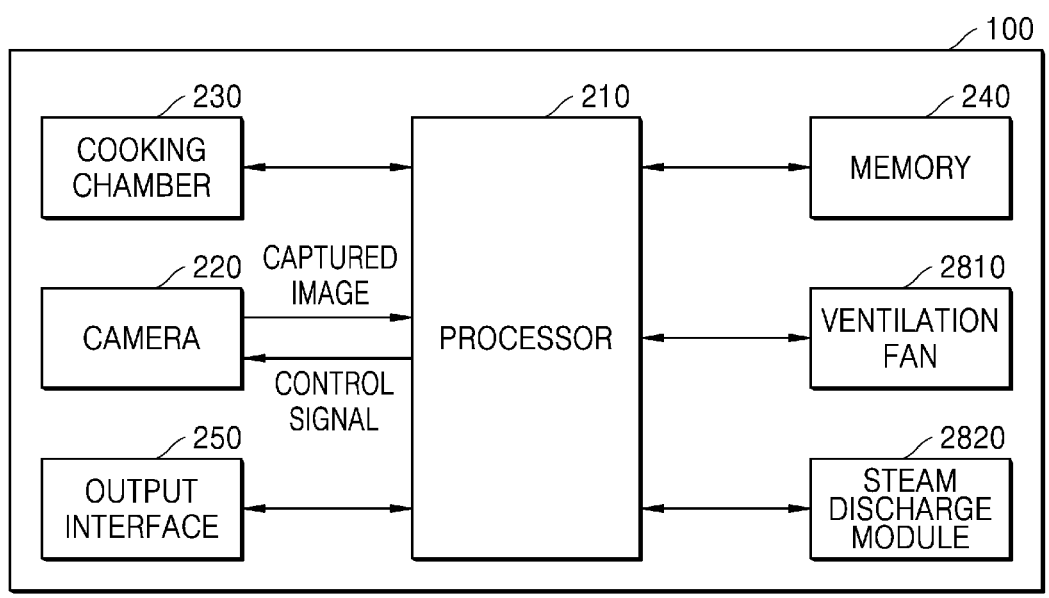
FIG. 28 is a block diagram of a structure of a cooking apparatus according to an embodiment of the disclosure.

FIG. 28 is a block diagram of a structure of a cooking apparatus according to an embodiment of the disclosure.

According to an embodiment of the disclosure, the cooking apparatus 100 may circulate the air inside the cooking chamber 230 or discharge steam into the cooking chamber 230. When a fire hazard is detected, the cooking apparatus 100 may prevent fire by circulating the air inside the cooking chamber 230 or discharging steam into the cooking chamber 230.

The cooking apparatus 100 may prevent the inside of the cooking chamber 230 from being not properly photographed due to smoke, when the camera 220 photographs the inside of the cooking chamber 230. For example, when smoke is detected inside the cooking chamber 230, the cooking apparatus 100 removes the smoke to enable monitoring of the cooking chamber 230.

According to an embodiment of the disclosure, the cooking apparatus 100 may include the processor 210, the camera 220, the cooking chamber 230, the memory 240, the output interface 250, a ventilation fan 2810, and a steam discharge module 2820. Differences from the cooking apparatus 100 of FIG. 2 will now mainly be described with reference to FIG. 28.

The ventilation fan 2810 may discharge the air inside the cooking chamber 230 to the outside. The ventilation fan 2810 may include fan blades for circulating the air, a motor, and a driving circuit for circulating air. The ventilation fan 2810 may further include a predetermined filter. The processor 210 may output a driving signal for driving the ventilation fan 2810 to the ventilation fan 2810. The ventilation fan 2810 may operate under a control by the processor 210. The ventilation fan 2810 may operate with one or more levels of intensity. The processor 210 may adjust the intensity of the ventilation fan 2810.

The steam discharge module 2820 discharges steam into the cooking chamber 230. The steam discharge module 2820 may generate steam by heating water by using a heating device, and discharge the steam into the cooking chamber 230. The steam discharge module 2820 may discharge steam with one or more levels of intensity. The processor 210 may generate a control signal for controlling the steam discharge module 2820, and output the control signal to the steam discharge module 2820. The processor 210 may control the steam discharge module 2820 to adjust a temperature or intensity of the steam of the steam discharge module 2820.

According to an embodiment of the disclosure, the processor 210 may operate the ventilation fan 2810 and the steam discharge module 2820 when a fire hazard is detected. When a fire hazard is detected and steam is discharged into the cooking chamber 230, the processor 210 may output a message indicating that a fire hazard is detected and steam is discharged, through the output interface 250 or the user apparatus 1910. When the fire hazard is not detected after the fire hazard is detected and steam is discharged, the processor 210 may control the steam discharge module 2820 to stop discharging steam. When a fire hazard is detected and the ventilation fan 2810 is operated, the processor 210 may output a message indicating that a fire hazard is detected and the ventilation fan 2810 is operated, through the output interface 250 or the user apparatus 1910. When the fire hazard is not detected after the fire hazard is detected and the ventilation fan 2810 is operated, the processor 210 may control the ventilation fan 2810 to stop its operation.

According to an embodiment of the disclosure, when flame is detected, the processor 210 may control the steam discharge module 2820 to discharge steam to the cooking chamber 230.

According to an embodiment of the disclosure, when smoke is detected, the processor 210 may operate the ventilation fan 2810. The processor 210 may adjust the intensity of the ventilation fan 2810 according to the intensity of smoke. The processor 210 may determine the concentration of smoke, set the intensity of the ventilation fan 2810 high when it is determined that the concentration of smoke is high, and set the intensity of the ventilation fan 2810 low when it is determined that the concentration of smoke is low. The processor 210 may determine the concentration of smoke, based on color data of a captured image. When a similarity between the color data of the captured image and the smoke-related color is high, the processor 210 may determine that the concentration of smoke is high. When the similarity between the color data of the captured image and the smoke-related color is low, the processor 210 may determines that the concentration of smoke is low.

According to an embodiment of the disclosure, when smoke is detected, the processor 210 may discharge the smoke through the steam discharge module 2820. The processor 210 may adjust the steam discharge amount of the steam discharge module 2820.

According to an embodiment of the disclosure, the processor 210 may operate both the ventilation fan 2810 and the steam discharge module 2820 when smoke is detected. When smoke is detected, the processor 210 may determine whether to operate only one of the ventilation fan 2810 and the steam discharge module 2820 or both of them, according to the concentration of the smoke. For example, when smoke is detected, the processor 210 operates only the ventilation fan 2810 when the smoke concentration is low, and operates both the ventilation fan 2810 and the steam discharge module 2820 when the smoke concentration is high.

Figure 29:
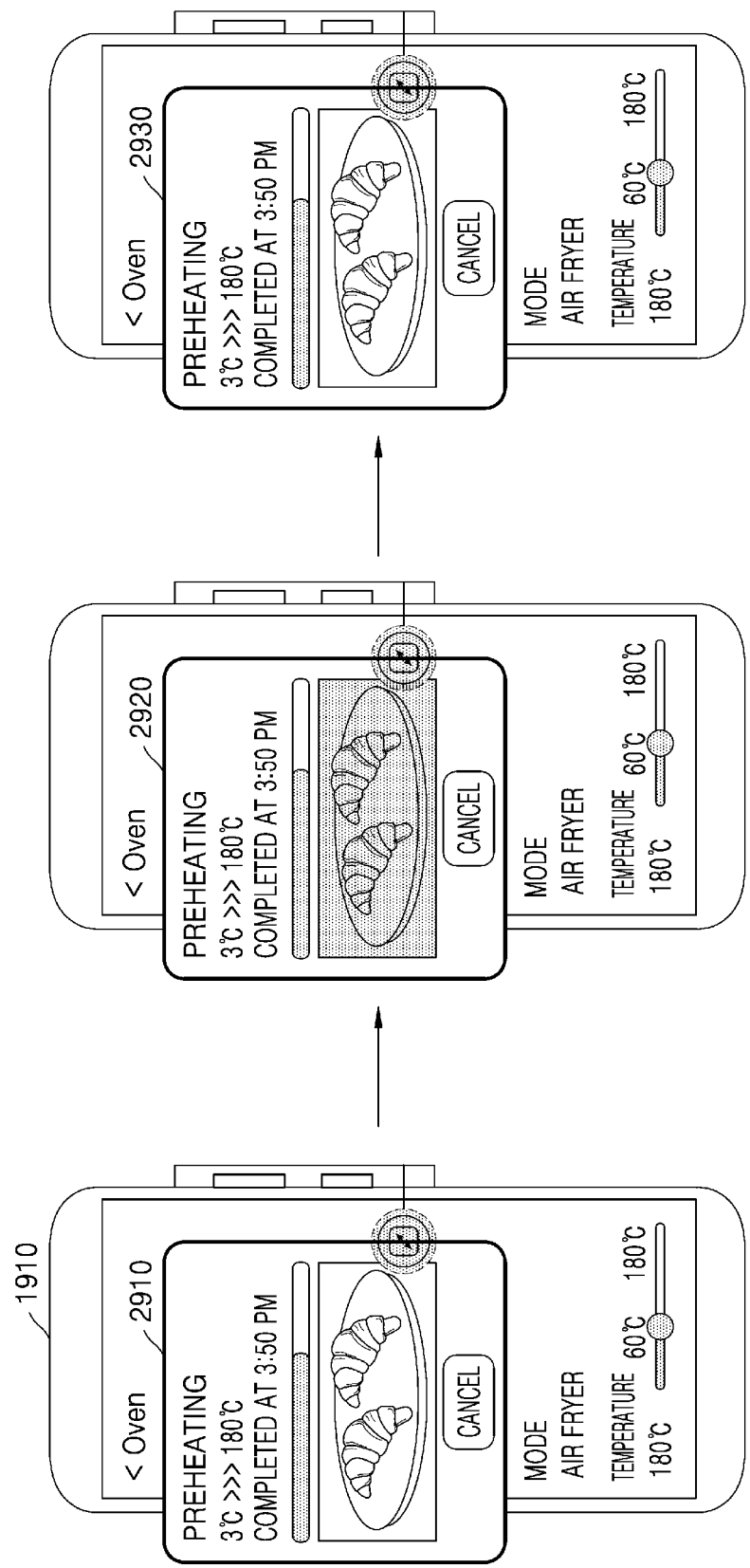
FIG. 29 is a view illustrating a process of monitoring a cooking operation of a cooking apparatus, according to an embodiment of the disclosure.

FIG. 29 is a view illustrating a process of monitoring a cooking operation of a cooking apparatus, according to an embodiment of the disclosure.

According to an embodiment of the disclosure, the cooking apparatus 100 transmits a captured image to the user apparatus 1910. The user apparatus 1910 displays the captured image through the first application. The first application may provide information such as an operating mode, a temperature, and the like of the cooking apparatus 100.

According to an embodiment of the disclosure, when smoke is produced inside the cooking chamber 230 while the first application is monitoring the inside of the cooking chamber 230, the cooking apparatus 100, the server 1920, or the user apparatus 1910 may control the cooking apparatus 100 to remove the smoke from the cooking chamber 230. While the first application is displaying a captured image obtained by photographing the inside of the cooking chamber 230 of the cooking apparatus 100 as in operation 2910, smoke may be produced inside the cooking chamber 230, in operation 2920. In this case, according to an embodiment of the disclosure, the cooking apparatus 100 removes smoke from the cooking chamber 230 by using the ventilation fan 2910 or the steam discharge module 2820. Due to the removal of the smoke, the first application may provide a captured image from which the smoke has been removed, in operation 2930.

According to an embodiment of the disclosure, the first application may have a menu that requests the cooking apparatus 100 to remove smoke. In response to a smoke removal request, the first application transmits the smoke removal request to the cooking apparatus 100. The cooking apparatus 100 receives the smoke removal request, and removes the smoke inside the cooking chamber 230 by controlling the ventilation fan 2810 or the steam discharge module 2820.

FIG. 30 is a block diagram of a structure of a cooking apparatus according to an embodiment of the disclosure.

A cooking apparatus 3000 according to an embodiment of the disclosure may include a sensor 3010, an output interface 3020, an input interface 3030, a memory 3040, a communication interface 3050, a cooking module 3060, a camera 3070, a power module 3080, and a processor 3090. The cooking apparatus 3000 may be configured with various combinations of the components shown in FIG. 30, and not all of the components shown in FIG. 30 are essential.

The cooking apparatus 3000 of FIG. 30 corresponds to the cooking apparatus 100 described above with reference to FIGS. 2, 9, 18, and 28. The camera 3070 corresponds to the camera 220 of FIG. 2. The memory 3040 corresponds to the memory 240 of FIG. 2. The communication interface 3050 corresponds to the communication module 1810 of FIG. 18. The processor 3090 corresponds to the processor 210 of FIG. 2. A temperature sensor 3011 corresponds to the temperature sensor 910 of FIG. 9. The output interface 3020 corresponds to the output interface 250 of FIG. 2. The input interface 3030 corresponds to the input interface 1820 of FIG. 18. A cooking chamber 3061 corresponds to the cooking chamber 230 of FIG. 2. A ventilation fan 3062 corresponds to the ventilation fan 2810 of FIG. 28. A steam discharge module 3063 corresponds to the steam discharge module 2820 of FIG. 28.

The sensor 3010 may include various types of sensors, for example, the temperature sensor 3011 and a smoke sensor 3012.

The output interface 3020 may include one or both of a display 3021 or a speaker 3022, or a combination thereof. The output interface 3020 outputs various notifications, messages, pieces of information, etc. created by the processor 3090.

The input interface 3030 may include a key 3031, a touch pad 3032, a dial 3033, and the like. The input interface 3030 receives a user input and transmits the user input to the processor 3090.

The memory 3040 stores various pieces of information, data, instructions, programs, etc. necessary for operations of the cooking apparatus 3000. The memory 3040 may include one or both of volatile memory and nonvolatile memory, or a combination thereof. The memory 3040 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk. The cooking apparatus 3000 may operate a web storage or cloud server on the Internet which performs a storage function.

The communication module 3050 may include at least one of a short-range communication interface 3052 or a mobile communication interface 3054 or a combination thereof. The communication module 3050 may include at least one antenna for communicating with other devices wirelessly.

The short-range wireless communication interface 3052 may include, but is not limited to, a Bluetooth communication interface, a BLE communication interface, a NFC interface, a WLAN (Wi-Fi) communication interface, a Zigbee communication interface, an IrDA communication interface, a WFD communication interface, a UWB communication interface, an Ant+ communication interface, and a micro-wave (uWave) communication interface.

The mobile communication interface 3054 may exchange a wireless signal with at least one selected from a base station, an external terminal, and a server on a mobile communication network. Here, examples of the wireless signal may include a voice call signal, a video call signal, and various types of data according to text/multimedia message exchange.

The cooking module 3060 may include a cooking chamber 3061, the ventilation fan 3062, the steam discharge module 3063, a door 3064, a heating module 3065, and the like. The cooking chamber 3061 accommodates food ingredients. The ventilation fan 3062 circulates the air inside the cooking chamber 3061. The steam discharge module 3063 discharges steam into the cooking chamber 3061. The door 3064 opens/closes the cooking chamber 3061. The heating module 3065 supplies heat to the cooking chamber 3061 to adjust an internal temperature of the cooking chamber 3061.

The camera 3070 photographs the inside of the cooking chamber 3061.

The power module 3080 supplies power to the cooking apparatus 3000. The power module 3080 may include a battery, a power driving circuit, a converter, a transformation circuit, and the like. The power module 3080 is connected to an external power supply to receive power.

The processor 3090 may control all operations of the cooking apparatus 3000. The processor 3090 may control the components of the cooking apparatus 3000 by executing the programs stored in the memory 3040.

According to an embodiment of the disclosure, the processor 3090 may include a separate NPU for performing an operation of a machine-learning model. The processor 3090 may also include a central processing unit (CPU), a graphics processing unit (GPU), etc.

The processor 3090 may perform operations of the cooking apparatus 3000, such as control of an operation mode, determination and control of travel routes, obstacle recognition, control of cleaning operations, location recognition, communication with external servers, monitoring of remaining battery capacity, and control of battery charging operations.

The machine-readable storage medium may be provided as a non-transitory storage medium. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory recording medium may include a buffer in which data is temporarily stored.

According to an embodiment of the disclosure, a method according to various disclosed embodiments may be provided by being included in a computer program product. The computer program product, which is a commodity, may be traded between sellers and buyers. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

According to an aspect of the disclosure, a cooking apparatus 100 may include a cooking chamber 230 configured to accommodate objects to be cooked, a camera 220 configured to photograph an inside of the cooking chamber, an output interface 250, a memory 240 configured to store at least one instruction, and at least one processor 210. The at least one processor 210 is configured to execute the at least one instruction to detect a fire hazard during cooking, based on a captured image obtained by the camera 220, and, based on the detection of the fire hazard, output a fire hazard notification through the output interface 250.

According to an embodiment of the disclosure, the at least one processor 210 may be further configured to execute the at least one instruction to identify, based on color data of each pixel of the captured image, at least one monitoring region from the captured image e, and, based on a similarity between color data of the at least one monitoring region and a predetermined fire-related color, determine whether the fire hazard is detected.

According to an embodiment of the disclosure, the at least one processor 210 may be further configured to execute the at least one instruction to identify, from the captured image, a type and a color of a food ingredient present in the cooking chamber, and, based on the identified type and color of the food ingredient, determine a region corresponding to the food ingredient not corresponding to the fire-related color as the monitoring region.

According to an embodiment of the disclosure, the at least one processor 210 may be further configured to execute the at least one instruction to determine, as the monitoring region, a region corresponding to a food ingredient of which a color before the food ingredient is cooked and a color after the food ingredient is cooked do not correspond to the fire-related color.

According to an embodiment of the disclosure, the at least one processor 210 may be further configured to execute the at least one instruction to identify at least one region not corresponding to the fire-related color from the captured image and identify the at least one region not corresponding to the fire-related color as at least one monitoring region.

According to an embodiment of the disclosure, the at least one processor 210 may be further configured to execute the at least one instruction to, based on a determination that color data of a first monitoring region among the at least one monitoring region has a similarity with the fire-related color that is equal to or greater than a reference value, change the first monitoring region to another region having a low similarity with the fire-related color, and, based on a determination that a similarity of the changed first monitoring region with the fire-related color is changed to the reference value or more, determine that a fire hazard has been detected.

According to an embodiment of the disclosure, the at least one processor 210 may be further configured to execute the at least one instruction to calculate a distance between first coordinates of the color data of the at least one monitoring region defined on a color space and second coordinates of the fire-related color defined on the color space, and, when the distance is lower than a reference value, detect that there is a fire hazard.

According to an embodiment of the disclosure, the reference value may be determined according to the type of the food ingredient recognized from the captured image.

According to an embodiment of the disclosure, the fire-related color may include a smoke-related color corresponding to smoke and a flame-related color corresponding to flame.

According to an embodiment of the disclosure, the cooking apparatus 100 may further include a temperature sensor 910 configured to measure an internal temperature of the cooking chamber 230, and the at least one processor 210 may be further configured to execute the at least one instruction to, based on the detection of the fire hazard during cooking based on the captured image, repeat the determination of the fire hazard based on a temperature detection value of the temperature sensor 910.

According to an embodiment of the disclosure, the cooking apparatus 100 may further include an input interface 1820, and a heating module 920 configured to heat the inside of the cooking chamber, and the at least one processor 210 may be further configured to execute the at least one instruction to receive a user input for selecting a set temperature through the input interface 1820, perform temperature control by controlling the heating module 920, based on the temperature detection value of the temperature sensor 910 and the set temperature, detect the fire hazard during cooking based on the captured image, and detect occurrence of a fire the based on a determination that temperature detection value is higher than a prediction temperature predicted by the temperature control.

According to an embodiment of the disclosure, the cooking apparatus 100 may further include a communication module 1810, and the at least one processor 210 is further configured to execute the at least one instruction to, based on the detection of the fire hazard, transmit the fire hazard notification to at least one external device through the communication interface 1810.

According to an embodiment of the disclosure, the cooking apparatus 100 may further include a ventilation fan 2810 configured to circulate internal air to an outside, and a steam discharge module 2820 configured to supply steam to the inside of the cooking chamber 230, and the at least one processor 210 may be further configured to execute the at least one instruction to, based on the detection of the fire hazard, perform at least one of an operation of controlling the ventilation fan 2810 to discharge smoke from the cooking chamber 210 or an operation of controlling the steam discharge module 2820 to supply steam to the inside of the cooking chamber 230.

According to an embodiment of the disclosure, the cooking apparatus 100 may further include a ventilation fan 2810 configured to circulate internal air to an outside, and a steam discharge module 2820 configured to supply steam to the inside of the cooking chamber 230, and the at least one processor 210 may be further configured to execute the at least one instruction to based on detection of smoke from the captured image, perform at least one of an operation of controlling the ventilation fan 2810 to discharge smoke from the cooking chamber 230 or an operation of controlling the steam discharge module 2820 to supply steam to the inside of the cooking chamber 230.

According to an embodiment of the disclosure, a method of controlling a cooking apparatus including a camera that photographs the inside of a cooking chamber accommodating an object to be cooked may include photographing the inside of the cooking chamber by using the camera, detecting a fire hazard during cooking, based on a captured image obtained by photographing the inside of the cooking chamber, and, based on detection of the fire hazard, outputting a fire hazard notification.

According to another aspect of the disclosure, a non-transitory computer-readable recording medium has recorded thereon a computer program, which, when executed by a computer, performs the method of controlling the cooking apparatus.

The invention claimed is:

1. A cooking apparatus comprising:
a cooking chamber configured to accommodate objects to be cooked;
a camera positioned within the cooking chamber and configured to photograph an inside of the cooking chamber;
an output interface;
memory configured to store at least one instruction; and
at least one processor operatively coupled to the memory, wherein the at least one instruction, when executed by the at least one processor individually or collectively, causes the cooking apparatus to:
obtain an image of the inside of the cooking chamber captured by the camera;
detect a fire hazard during cooking based on the image; and
based on the detection of the fire hazard, outputting a fire hazard notification through the output interface.

2. The cooking apparatus of claim 1, wherein the at least one instruction, when executed by the at least one processor individually or collectively, further causes the cooking apparatus to:
identify, based on color data of each pixel of the image, at least one monitoring region from the image; and
based on a similarity between color data of the at least one monitoring region and a predetermined fire-related color, determine whether the fire hazard is detected.

3. The cooking apparatus of claim 2, wherein the at least one instruction, when executed by the at least one processor individually or collectively, further causes the cooking apparatus to:
identify, from the image, a type and a color of a food ingredient present in the cooking chamber; and
based on the identified type and color of the food ingredient, determine a region corresponding to the food ingredient as the at least one monitoring region.

4. The cooking apparatus of claim 3, wherein the at least one instruction, when executed by the at least one processor individually or collectively, further causes the cooking apparatus to:
determine, as the at least one monitoring region, the region corresponding to the food ingredient, based on a color before the food ingredient is cooked and a color after the food ingredient is cooked not corresponding to the predetermined fire-related color.

5. The cooking apparatus of claim 2, wherein the at least one instruction, when executed by the at least one processor individually or collectively, further causes the cooking apparatus to:
identify at least one region not corresponding to the predetermined fire-related color from the image; and
identify the at least one region not corresponding to the predetermined fire-related color as the at least one monitoring region.

6. The cooking apparatus of claim 5, wherein the at least one instruction, when executed by the at least one processor individually or collectively, further causes the cooking apparatus to:
based on a determination that color data of a first monitoring region among the at least one monitoring region has a similarity with the predetermined fire-related color, the similarity being equal to or greater than a reference value, change the monitoring region from the first monitoring region to another region having a lower similarity with the predetermined fire-related color; and
based on a determination that a similarity of the changed monitoring region with the predetermined fire-related color is changed to the reference value or more, determine that the fire hazard has been detected.

7. The cooking apparatus of claim 2, wherein the at least one instruction, when executed by the at least one processor individually or collectively, further causes the cooking apparatus to:
calculate a distance between first coordinates of the color data of the at least one monitoring region defined on a color space and second coordinates of the predetermined fire-related color defined on the color space; and
when the distance is lower than a reference value, determine that there is the fire hazard.

8. The cooking apparatus of claim 7, wherein the reference value is determined based on a type of a food ingredient recognized from the image.

9. The cooking apparatus of claim 2, wherein the predetermined fire-related color comprises a smoke-related color corresponding to smoke and a flame-related color corresponding to flame.

10. The cooking apparatus of claim 1, wherein the cooking apparatus further comprises a temperature sensor configured to measure an internal temperature of the cooking chamber, and
wherein the at least one instruction, when executed by the at least one processor individually or collectively, further causes the cooking apparatus to, based on the detection of the fire hazard during cooking based on the image, repeat the detection of the fire hazard based on a temperature detection value of the temperature sensor.

11. The cooking apparatus of claim 10, wherein the cooking apparatus further comprises:
an input interface; and
a heating module configured to heat the inside of the cooking chamber, and
wherein the at least one instruction, when executed by the at least one processor individually or collectively, further causes the cooking apparatus to:
receive a user input for selecting a set temperature through the input interface;
based on the temperature detection value of the temperature sensor and the set temperature, perform temperature control by controlling the heating module; and
detect the fire hazard during cooking based on the image, and detect occurrence of a fire based on a determination that the temperature detection value is higher than a temperature predicted by the temperature control.

12. The cooking apparatus of claim 1, wherein the cooking apparatus further comprises a communication interface, and
wherein the at least one instruction, when executed by the at least one processor, further causes the cooking apparatus to, based on the detection of the fire hazard, transmit the fire hazard notification to at least one external device through the communication interface.

13. The cooking apparatus of claim 1, further comprising:
a ventilation fan configured to circulate internal air to an outside; and
a steam discharge module configured to supply steam to the inside of the cooking chamber, and
wherein the at least one instruction, when configured by the at least one processor individually or collectively, further causes the cooking apparatus to, based on the detection of the fire hazard, perform at least one of an operation of controlling the ventilation fan to discharge smoke from the cooking chamber or an operation of controlling the steam discharge module to supply steam to the inside of the cooking chamber.

14. The cooking apparatus of claim 1, further comprising:
a ventilation fan configured to circulate internal air to an outside; and
a steam discharge module configured to supply steam to the inside of the cooking chamber, and
wherein the at least one instruction, when executed by the at least one processor individually or collectively, further causes the cooking apparatus to, based on detection of smoke from the image, perform at least one of an operation of controlling the ventilation fan to discharge the smoke from the cooking chamber or an operation of controlling the steam discharge module to supply steam to the inside of the cooking chamber.

15. A method of controlling a cooking apparatus, wherein the cooking apparatus comprises a camera positioned within a cooking chamber and configured to photograph an inside of the cooking chamber accommodating an object to be cooked, the method comprising:
photographing the inside of the cooking chamber by using the camera to obtain an image of the inside of the cooking chamber;
detecting a fire hazard during cooking, based on the image; and
based on the detection of the fire hazard, outputting a fire hazard notification.

16. The method of claim 15, further comprising:
identifying, based on color data of each pixel of the image, at least one monitoring region from the image; and
based on a similarity between color data of the at least one monitoring region and a predetermined fire-related color, determining whether the fire hazard is detected.

17. The method of claim 16, wherein the identifying of the at least one monitoring region comprises:
identifying a type and a color of a food ingredient present in the cooking chamber from the image; and
based on the identified type and color of the food ingredient, determining a region corresponding to the food ingredient as the at least one monitoring region.

18. The method of claim 16, wherein the identifying of the at least one monitoring region comprises:
identifying at least one region not corresponding to the predetermined fire-related color from the image; and
identifying the at least one region not corresponding to the predetermined fire-related color as the at least one monitoring region.

19. The method of claim 16, wherein the detecting of the fire hazard comprises:
calculating a distance between first coordinates of color data of the at least one monitoring region defined on a color space and second coordinates of the predetermined fire-related color defined on the color space; and
based on a determination that the distance on the color space is lower than a reference value, determining that there is the fire hazard.

20. A non-transitory computer-readable recording medium having recorded thereon a computer program, which, when executed by a computer, causes the computer to execute a method comprising:
photographing, using a camera positioned within a cooking chamber accommodating an object to be cooked, an inside of the cooking chamber to obtain an image of the inside of the cooking chamber;
detecting a fire hazard during cooking, based on the image; and
based on the detection of the fire hazard, outputting a fire hazard notification.

* * * * *